US 11,703,733 B2

(12) United States Patent
Matsushima et al.

(10) Patent No.: US 11,703,733 B2
(45) Date of Patent: Jul. 18, 2023

(54) DISPLAY DEVICE

(71) Applicant: Japan Display Inc., Tokyo (JP)

(72) Inventors: Toshiharu Matsushima, Tokyo (JP); Hitoshi Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/654,101

(22) Filed: Mar. 9, 2022

(65) Prior Publication Data

US 2022/0197096 A1 Jun. 23, 2022

Related U.S. Application Data

(63) Continuation of application No. PCT/JP2020/029046, filed on Jul. 29, 2020.

(30) Foreign Application Priority Data

Sep. 11, 2019 (JP) .................................. 2019-165384

(51) Int. Cl.
*G02F 1/1343* (2006.01)
*G02F 1/1362* (2006.01)
*G02F 1/1335* (2006.01)

(52) U.S. Cl.
CPC .. *G02F 1/136286* (2013.01); *G02F 1/133512* (2013.01); *G02F 1/134309* (2013.01)

(58) Field of Classification Search
CPC ......... G02F 1/136286; G02F 1/133512; G02F 1/134309
See application file for complete search history.

(56) References Cited

U.S. PATENT DOCUMENTS

| 2008/0198318 | A1* | 8/2008 | Lee .................. | G02F 1/134363 349/187 |
| 2014/0293176 | A1 | 10/2014 | Tamaki et al. | |
| 2014/0354931 | A1 | 12/2014 | Kurasawa et al. | |
| 2015/0160520 | A1* | 6/2015 | Matsushima ..... | G02F 1/134309 349/123 |
| 2018/0203306 | A1 | 7/2018 | Matsushima | |

FOREIGN PATENT DOCUMENTS

| JP | 2014-209213 A | 11/2014 |
| JP | 2014-232136 A | 12/2014 |
| JP | 2018-087894 A | 6/2018 |
| JP | 2018-116184 A | 7/2018 |

OTHER PUBLICATIONS

International Search Report dated Oct. 20, 2020 in PCT/JP2020/029046 filed on Jul. 29, 2020, 2 pages.

* cited by examiner

*Primary Examiner* — James A Dudek
(74) *Attorney, Agent, or Firm* — Maier & Maier, PLLC

(57) ABSTRACT

According to one embodiment, A display device including a first substrate, a second substrate, and a liquid crystal layer, wherein the first substrate includes a first common electrode, a pixel electrode, a scanning line, and a signal line, the first common electrode includes a shaft portion extending in the second direction, a first branch portion extending in the first direction from the shaft portion, and a second branch portion extending in the first direction from the shaft portion, a first opening and a second opening are provided, the first branch portion overlaps the pixel electrode and the first opening, and the second branch portion overlaps the scanning line between the first opening and the second opening.

13 Claims, 16 Drawing Sheets

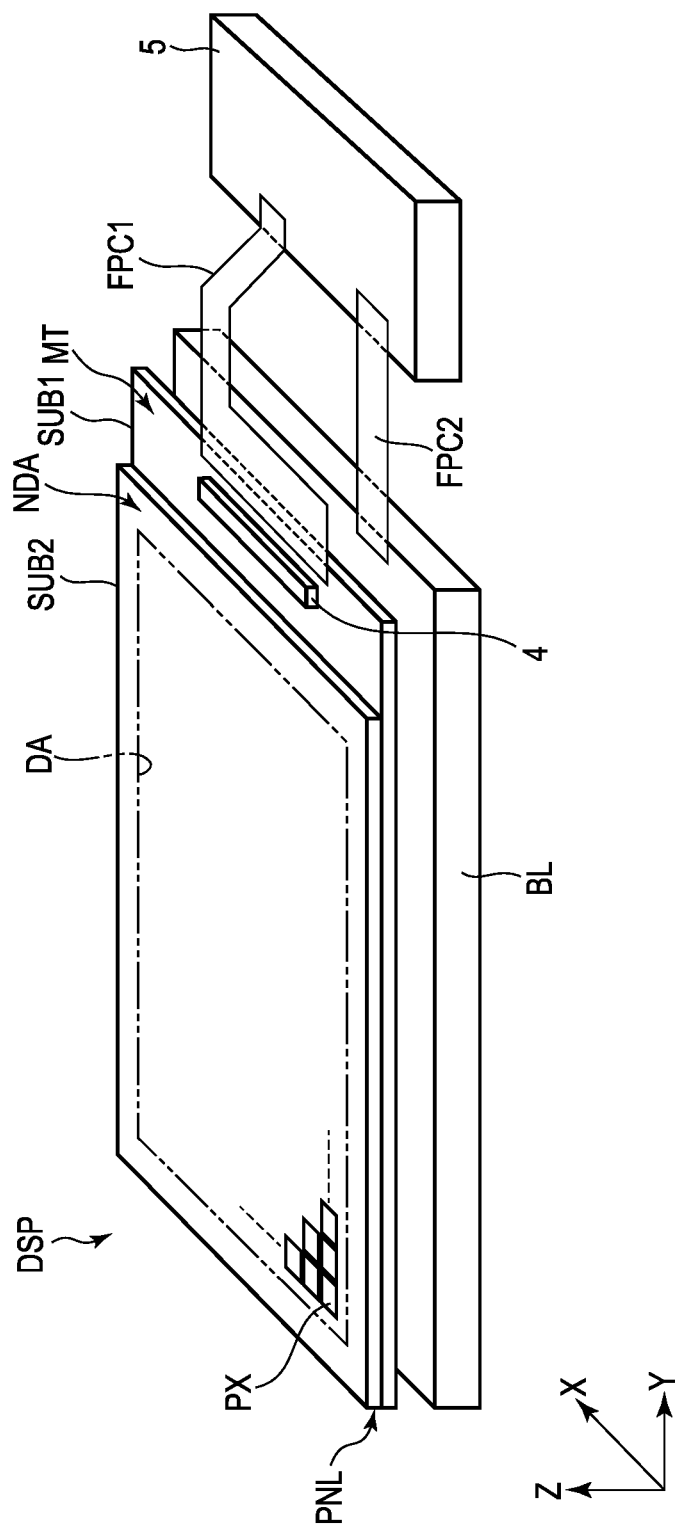
F I G. 1

DISPLAY DEVICE

CROSS-REFERENCE TO RELATED APPLICATIONS

This application is a Continuation Application of PCT Application No. PCT/JP2020/029046, filed Jul. 29, 2020 and based upon and claiming the benefit of priority from Japanese Patent Application No. 2019-165384, filed Sep. 11, 2019, the entire contents of all of which are incorporated herein by reference.

FIELD

Embodiments of the present invention relate to a display device.

BACKGROUND

An ultra-high-definition display device that implements a high-speed response mode in which a response speed is increased as compared with a conventional fringe filed switching (FFS) mode is considered.

BRIEF DESCRIPTION OF THE DRAWINGS

FIG. 1 is a perspective view showing an example of a schematic configuration of a liquid crystal display device according to a first embodiment.

DETAILED DESCRIPTION

Figure 2:
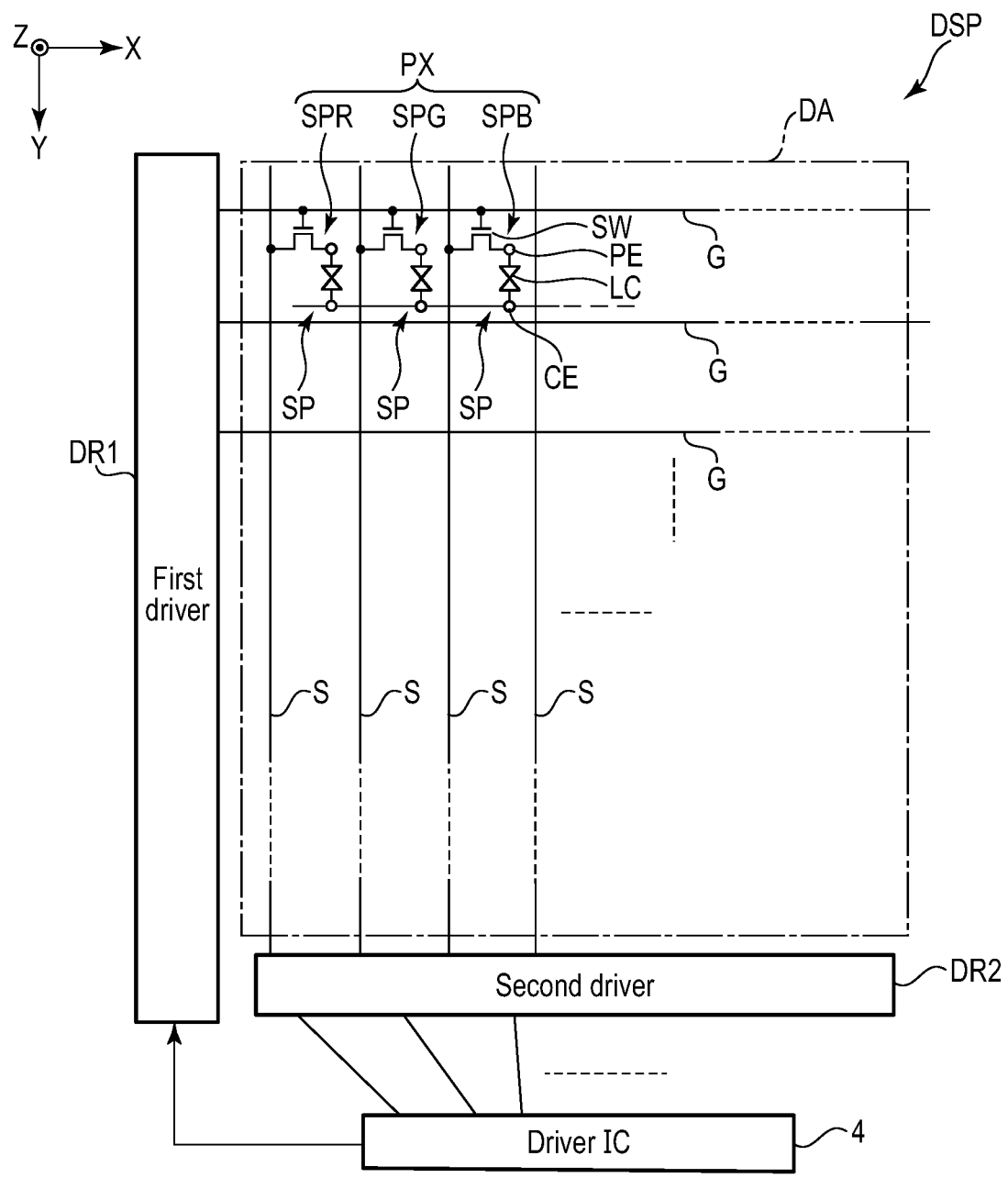
FIG. 2 is a diagram showing an example of a schematic equivalent circuit of the display device.

In general, according to one embodiment, a display device comprising: a first substrate; a second substrate opposed to the first substrate; and a liquid crystal layer located between the first substrate and the second substrate, wherein the first substrate includes a first common electrode, a pixel electrode, a scanning line, and a signal line, the scanning line is formed to extend in a first direction, the signal line is formed to extend in a second direction, the first common electrode includes a shaft portion extending in the second direction, a first branch portion extending in the first direction from the shaft portion, and a second branch portion extending in the first direction from the shaft portion, a first opening surrounded by a pair of the scanning lines and a pair of the signal lines, and a second opening surrounded by a pair of the scanning lines and a pair of the signal lines and provided at an interval from the first opening in the second direction are provided, the first branch portion overlaps the pixel electrode and the first opening, and the second branch portion overlaps the scanning line between the first opening and the second opening.

According to another embodiment, a display device comprising: a first substrate; a second substrate opposed to the first substrate; and a liquid crystal layer located between the first substrate and the second substrate, wherein the first substrate includes a first electrode and a pixel electrode, the second substrate includes a light-shielding layer, the first electrode includes a shaft portion extending in a first direction intersecting a second direction, a first branch portion extending in the first direction from the shaft portion, and a second branch portion extending in the first direction from the shaft portion, the light-shielding layer includes a first opening, a second opening arranged at an interval from the first opening in the second direction, and a third opening arranged at an interval from the first opening in the second direction on the opposite side of the second opening, the first opening overlaps a part of the first branch portion and a part of the second branch portion, and the pixel electrode overlaps the first opening.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

As an example of the electronic device, a display device will be disclosed in the following embodiments. The display devices can be used for, for example, various devices such as virtual reality (VR) viewers, smartphones, tablet terminals, mobile telephone terminals, notebook computers, vehicle-mounted devices, game consoles and wearable terminal devices.

First Embodiment

FIG. 1 is a plan view schematically showing a configuration of a liquid crystal display device DSP according to the first embodiment. In the following descriptions, a first direction X, a second direction Y and a third direction Z are orthogonal to each other, but they may intersect at an angle other than 90 degrees. The first direction X and the second direction Y correspond to the directions parallel to a main surface of a substrate that constitutes the liquid crystal display device DSP, (which will be simply referred to as display device DSP, hereinafter). The third direction Z is equivalent to a thickness direction of the display device DSP. Note that a direction from a first substrate SUB1 toward a second substrate SUB2 may be referred to as "upward" (or simply "up or above") and a direction from the second substrate SUB2 to the first substrate SUB1 may be referred to as "downward" (or simply "down or below").

With such expressions "a second member above a first member" and "a second member below a first member", the second member may be in contact with the first member or may be remote from the first member. In addition, git is assumed that there is an observation position to observe the display device DSP on a tip side of an arrow in a third direction Z, and viewing from this observation position toward the X-Y plane defined by the first direction X and the second direction Y is referred to as a planar view.

A display device DSP includes a display panel PNL, an illumination device BL opposed to the display panel PNL, a driver IC 4 that drives the display panel PNL, a control module 5 that controls operations of the display panel PNL and the illumination device BL, and flexible printed circuits FPC1 and FPC2 that transmit control signals to the display panel PNL and the illumination device BL. In the example shown in FIG. 1, short sides of the display device DSP extend along a first direction X, and long sides of the display device DSP extend along a second direction Y.

The display panel PNL includes a first substrate SUB1 and a second substrate SUB2 that are opposed to each other, and a display function layer (in the present embodiment, a liquid crystal layer LC to be described later) held between the substrates SUB1 and SUB2. The display panel PNL has a display region DA and a non-display region NDA. The display region DA is an area for displaying an image. The display region DA is located substantially at the center of an area where the first substrate SUB1 and the second substrate SUB2 are opposed to each other. The non-display region NDA is an area where no image is displayed, and is located outside the display region DA. The display panel PNL includes, for example, a plurality of pixels PX arranged in a matrix on the X-Y plane in the display region DA.

The driver IC 4 is located in the non-display region NDA. In the example shown in FIG. 1, the driver IC 4 is mounted on a mounting portion MT of the first substrate SUB1 extending on the outer side with respect to one substrate edge (alternatively referred to as a substrate end portion) of the second substrate SUB2. Incidentally, the driver IC 4 may be provided on the flexible printed circuit FPC 1.

In the example shown in FIG. 1, the flexible printed circuit FPC1 electrically connects the display panel PNL to the control module 5. For example, the flexible printed circuit FPC1 is electrically connected to a terminal (not shown) provided in the mounting portion MT of the first substrate SUB1 and a terminal (not shown) provided in the control module 5.

In the example shown in FIG. 1, the flexible printed circuit FPC2 electrically connects the illumination device BL to the control module 5. For example, the flexible printed circuit FP2 is electrically connected to a terminal (not shown) provided in the illumination device BL and a terminal (not shown) provided in the control module 5.

FIG. 2 is a diagram showing an example of a schematic equivalent circuit of the display device DSP. The display device DSP includes a first driver DR1, a second driver DR2, a plurality of scanning lines G connected to the first driver DR1, and a plurality of signal lines S connected to the second driver DR2. The scanning lines G extend in the first direction X in the display region DA and are arranged at intervals in the second direction Y. The signal lines S extend in the second direction Y in the display region DA, are arranged at intervals in the first direction X, and intersect the scanning lines G.

Each of the pixels PX includes a plurality of sub-pixels SP. In the present embodiment, it is assumed that one pixel PX includes one sub-pixel SPR, one sub-pixel SPG, and one sub-pixel SPB that display red, green, and blue, respectively. However, the pixel PX may further include a sub-pixel SP that displays white, or may include a plurality of sub-pixels SP corresponding to an identical color. Incidentally, each sub-pixel SP may be simply referred to as a pixel SP.

In FIG. 2, the sub-pixel SP corresponds to a region partitioned by two scanning lines G adjacent to each other in the first direction X and two signal lines S adjacent to each other in the second direction Y. Each sub-pixel SP includes a switching element SW, a pixel electrode PE, a common electrode CE opposed to the pixel electrode PE, and a liquid crystal layer LC, and the like. The common electrode CE is formed over the plurality of sub-pixels SP. A common electric potential is applied to the common electrode CE. The switching element SW is constituted by, for example, a thin-film transistor (TFT) and is electrically connected to the scanning line G, the signal line S, and the pixel electrode PE. More specifically, the switching element SW includes a gate electrode, a source electrode, a drain electrode, a semiconductor layer, and the like. For example, the gate electrode is electrically connected to the scanning line G, the source electrode is electrically connected to the signal line S, and the drain electrode is electrically connected to the pixel electrode PE and the semiconductor layer.

The scanning line G is electrically connected to the switching element SW in each of the pixels SP arranged in the first direction X. The signal line S is electrically connected to the switching element SW in each of the pixels SP arranged in the second direction Y. Each of the pixel electrodes PE is opposed to the common electrode CE, and the liquid crystal layer LC is driven by an electric field generated between the pixel electrode PE and the common electrode CE. For example, storage capacitance is formed between the common electrode CE and the pixel electrode PE.

The first driver DR1 sequentially supplies a scanning signal to each scanning line G. The second driver DR2 selectively supplies a video signal to each signal line S. When a scanning signal is supplied to the scanning line G corresponding to a certain switching element SW and a video signal is supplied to the signal line S connected to the switching element SW, a pixel electric potential corresponding to the video signal is applied to the pixel electrode PE. At this time, by the electric field generated between the pixel electrode PE and the common electrode CE, the alignment of liquid crystal molecules of the liquid crystal layer LC is changed from the initial aligned state in which no voltage is applied. By such an operation, an image is displayed in the display region DA.

Figure 3:
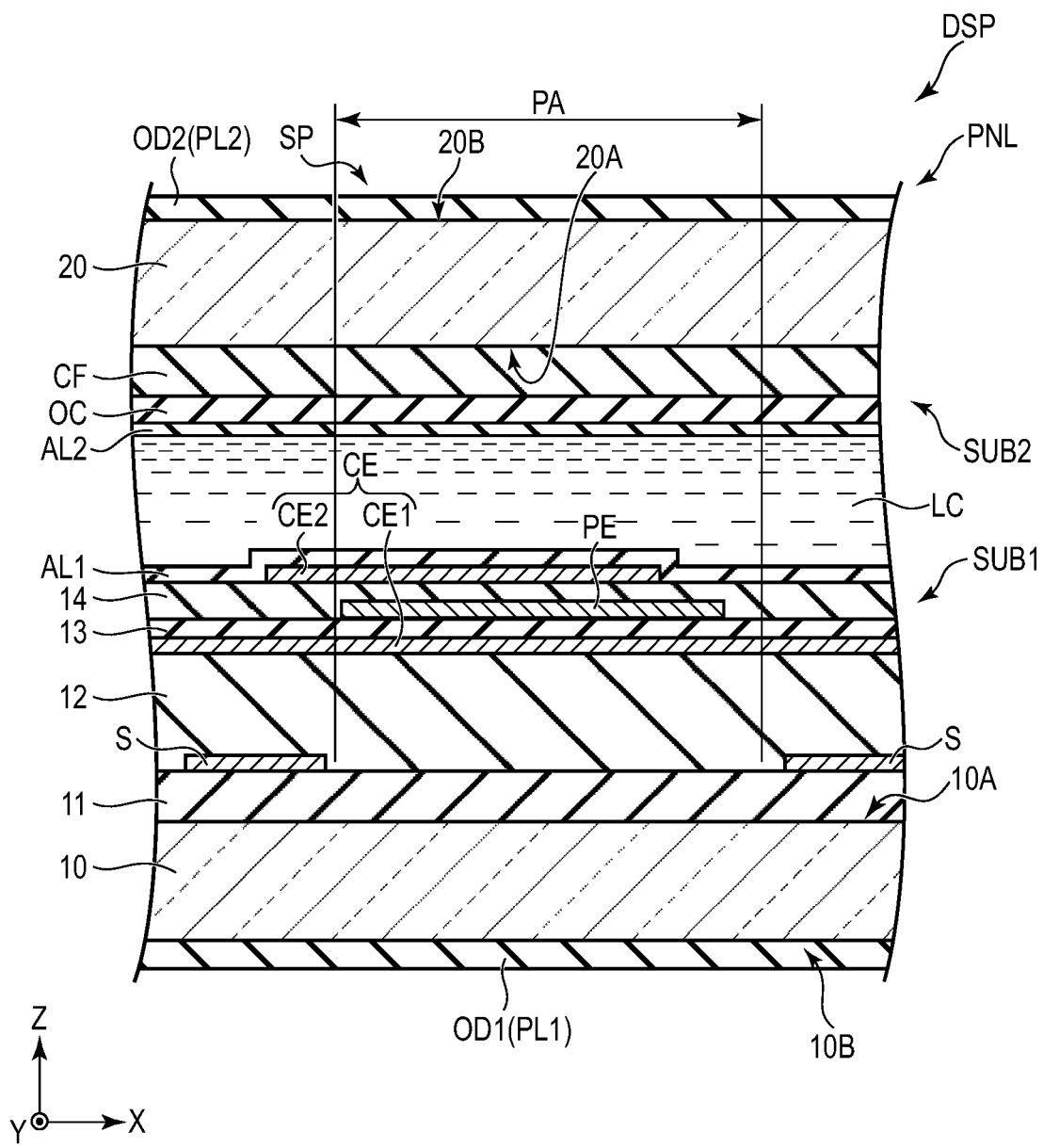
FIG. 3 is a cross-sectional view schematically showing an example of the display device according to the first embodiment.

FIG. 3 is a cross-sectional view schematically showing an example of the display device DSP according to the present embodiment. FIG. 3 shows a schematic cross section of one sub-pixel SP along the X direction.

The first substrate SUB1 includes an insulating substrate 10, insulating layers (a dielectric layers) 11, 12, 13, and 14, a signal line S, common electrodes CE (common electrode CE1 and common electrode CE2), a pixel electrode PE, an alignment film AL1, and the like. An optical element OD1 including a polarizing plate PL1 is provided under the insulating substrate 10.

The insulating substrate 10 is transparent, and is made of glass such as borosilicate glass, for example, but may be made of resin such as plastic. The insulating substrate 10 has a main surface 10A opposed to the second substrate SUB2 and an opposed surface 10B on the opposite side of the main surface 10A.

The insulating layers 11 to 14 are all transparent. The insulating layers 11, 13, and 14 are inorganic insulating layers, and are made of silicon nitride or silicon oxide, for example. The insulating layer 12 is an organic insulating layer, and is made of resin such as acrylic resin, for example. The insulating layer 11 is located on the insulating substrate 10 and is in contact with the main surface 10A of the insulating substrate 10. The signal line S is located on the insulating layer 11 and is in contact with the insulating layer 11. In the example shown in FIG. 3, the two signal lines S are located on the insulating layer 11 and disposed at an interval in the first direction X. The insulating layer 12 is located on the insulating layer 11 and the signal lines S and is in contact with the insulating layer 11 and the signal lines S. In the present embodiment, the signal lines S and the scanning lines G function as a light-shielding film, and a region surrounded by the signal lines S and the scanning lines G serves as a pixel opening (hereinafter, the pixel opening may be simply referred to as an opening) PA that substantially contributes to pixel display.

The common electrode CE1 is located on the insulating layer 12 and is in contact with the insulating layer 12. In other words, the common electrode CE1 is located between the insulating layer 12 and the insulating layer 13. The common electrode CE1 extends over the plurality of pixel electrodes PE. Incidentally, the common electrode CE1 is made of a transparent conductive material such as indium tin oxide (ITO), indium zinc oxide (IZO), or indium gallium oxide (IGO), for example. In addition, the common electrode CE1 may be made of a material in which a part overlapping a region contributing to display is transparent and in which other parts are not transparent. The insulating layer 13 is located on the common electrode CE1 and covers the common electrode CE1.

The pixel electrode PE has, for example, an electric potential different from that of the common electrode CE1. The pixel electrode PE is made of a transparent conductive material. For example, the pixel electrode PE may be made of the same material as the common electrode CE1. The pixel electrode PE is located on the insulating layer 13 and is in contact with the insulating layer 13. Incidentally, the pixel electrode PE may be made of a material in which a part overlapping a region contributing to display is transparent and in which other parts are not transparent. The insulating layer 14 is located on the insulating layer 13 and the pixel electrode PE, and covers the insulating layer 13 and the pixel electrode PE.

The common electrode CE2 is located on the insulating layer 14 and is in contact with the insulating layer 14. The common electrode CE2 is made of a transparent conductive material, and is formed of, for example, the same material as the common electrode CE1. The common electrode CE1 and the common electrode CE2 have the same electric potential, and for example, the same common electric potential is applied to the common electrode CE1 and the common electrode CE2. In the example shown in FIG. 3, the pixel electrode PE is located between the common electrode CE1 and the common electrode CE2. Although not shown, the common electrode CE1 and the common electrode CE2 are electrically connected to each other in, for example, the non-display region NDA. Incidentally, the common electrode CE2 may be made of a material in which a part overlapping a region contributing to display is transparent and in which other parts are not transparent.

The alignment film AL1 covers the insulating layer 14 and the common electrode CE2. The alignment film AL1 is, for example, a polyimide film. Incidentally, in the first substrate SUB1, a layer other than the layers described above may be located between the layers.

The liquid crystal layer LC is located on the first substrate SUB1. The liquid crystal layer LC may be a positive type having positive dielectric anisotropy or a negative type having negative dielectric anisotropy.

The second substrate SUB2 is located on the liquid crystal layer LC. The second substrate SUB2 includes an insulating substrate 20, a color filter CF, an overcoat layer OC, and an alignment film AL2. Incidentally, the color filter CF may be provided on the first substrate SUB1. An optical element OD2 including a polarizer PL2 is provided on the insulating substrate 20. The absorption axis of the polarizing plate PL1 and the absorption axis of the polarizer PL2 are set to be orthogonal to each other in planar view.

The insulating substrate 20 is transparent, and is made of glass such as borosilicate glass, for example, but may be made of resin such as plastic. The insulating substrate 20 has an opposed surface 20A opposed to the first substrate SUB1 and a main surface 20B on the opposite side of the opposed surface 20A.

The color filter CF is located under the insulating substrate 20 and covers the insulating substrate 20. The color filter CF is opposed to the pixel electrode PE. The color filter CF covers the opposed surface 20A of the insulating substrate 20. The color filter CF includes a red color filter, a green color filter, a blue color filter, and the like. In addition, the color filter CF may include four or more color filters. In the sub-pixel SP that displays white, a white color filter may be disposed, an uncolored resin material may be disposed, or the overcoat layer OC may be disposed without a color filter.

The overcoat layer OC is a transparent organic insulating layer, and is made of resin such as acrylic resin, for example. The overcoat layer OC is located under the color filter CF and covers the color filter CF. The overcoat layer OC planarizes the surface of the color filter CF.

The alignment film AL2 is located under the overcoat layer OC and covers the overcoat layer OC. The alignment film AL2 is, for example, a polyimide film. Incidentally, in the second substrate SUB2, a layer other than the layers described above may be located between the layers.

Figure 4:
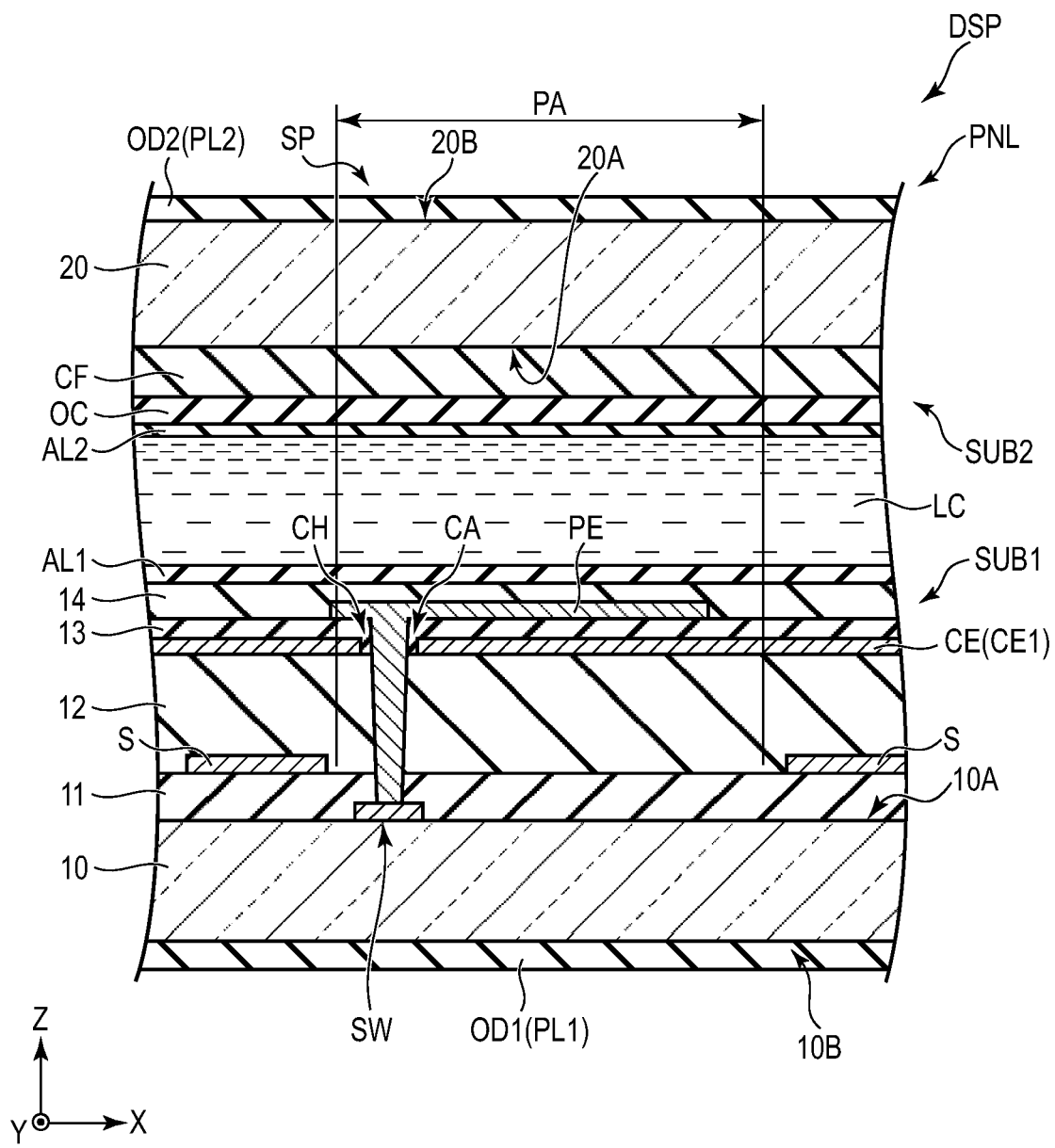
FIG. 4 is a cross-sectional view schematically showing an example of the display device according to the first embodiment.

FIG. 4 is a cross-sectional view schematically showing an example of the display device DSP according to the present embodiment. Incidentally, in this case, a configuration different from the configuration shown in FIG. 3 will be mainly described.

The first substrate SUB1 includes a contact hole CH, the switching element SW, and the like. The contact hole CH is formed via the insulating layers 11, 12, and 13, and penetrates a through hole CA formed in the common electrode CE1. The switching element SW is provided on the main surface 10A side of the insulating substrate 10. In other words, the switching element SW is located on the insulating substrate 10. In the example shown in FIG. 4, the switching element SW is located between the insulating substrate 10 and the insulating layer 11. In other words, the switching element SW is located on the insulating substrate 10 and covered with the insulating layer 11. The switching element SW is electrically connected to the pixel electrode PE through the contact hole CH. In FIG. 4, the scanning lines G and the switching element SW are omitted. Further, in FIG. 4, the switching element SW is shown in a simplified manner. In practice, the insulating layer 11 includes a plurality of layers, and the switching element SW includes the semiconductor layer and various electrodes formed on these layers.

Figure 5:
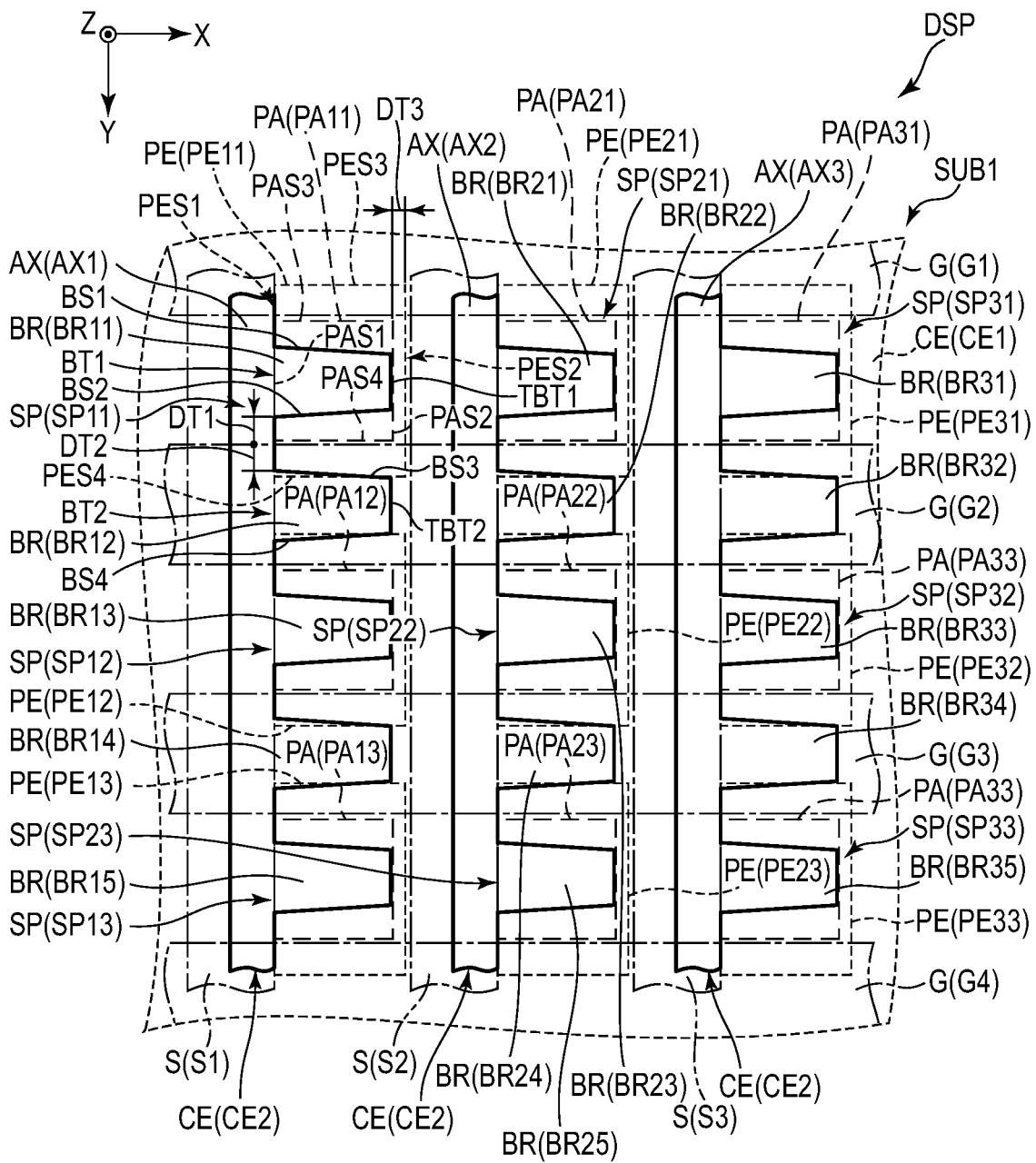
FIG. 5 is a plan view schematically showing a configuration example of a first substrate according to the first embodiment.

FIG. 5 is a plan view schematically showing a configuration example of the first substrate SUB1 according to the present embodiment. FIG. 5 shows a main portion of the first substrate SUB1. FIG. 5 shows a plurality of openings PA (PA11, PA12, PA13, PA21, PA22, PA23, PA31, PA32, PA33 . . . ). In FIG. 5, the openings PA11, PA12, PA13, PA21, PA22, PA23, PA31, PA32, and PA33 have the same shape and the same size. The openings PA11 to PA13 are arranged at regular intervals in the second direction Y. The openings PA21 to PA23 are arranged at regular intervals in the second direction Y. The openings PA31 to PA33 are arranged at regular intervals in the second direction Y. The openings PA11, PA21, and PA31 are arranged at regular intervals in the first direction X. The openings PA12, PA22, and PA32 are arranged at regular intervals in the first direction X. The openings PA13, PA23, and PA33 are arranged at regular intervals in the first direction X. In FIG. 5, the plurality of openings PA are formed in a rectangular shape. For example, the plurality of openings PA may have a square shape. Incidentally, the plurality of openings PA may have a rectangular shape, for example, a shape other than a square shape. The widths of the openings PA in the second direction are several μm, for example, is in a range of 2 to 4 μm. Hereinafter, "the width of a predetermined substance, object, space, or region in the first direction X" may be referred to as "lateral width", and "the width of the predetermined substance, object, space, or region in the second direction Y" may be referred to as "longitudinal width". In the example shown in FIG. 5, the opening PA11 includes a boundary PAS1, a boundary PAS2 located on the tip side of an arrow in the first direction X with respect to the boundary PAS1, a boundary PAS3 intersecting the boundaries PAS1 and PAS2, and a boundary PAS4 located on the tip side of an arrow in the second direction Y with respect to the boundary PAS3. The boundary PAS1 and the boundary PAS2 are opposed to each other in the first direction X. The boundary PAS3 and the boundary PAS4 are opposed to each other in the second direction Y.

The first substrate SUB1 includes the plurality of signal lines S (S1, S2, S3 . . . ), the plurality of scanning lines G (G1, G2, G3, G4 . . . ), the pixel electrodes PE (PE11, PE12, PE13, PE21, PE22, PE23, PE31, PE32, PE33 . . . ), the common electrode CE1, the common electrode CE2, and the like.

The plurality of signal lines S (S1 to S3 . . . ) extend in the second direction Y. In the example shown in FIG. 5, the plurality of signal lines S1 to S3 extend linearly in the second direction Y, but may be bent. The plurality of signal lines S1 to S3 are arranged at regular intervals in the first direction X. The plurality of signal lines S are, for example, a three-layer laminated film in which titanium, aluminum, and titanium are laminated in this order, a three-layer laminated film in which aluminum, titanium, and aluminum are laminated in this order, or the like.

The plurality of gate lines G (G1 to G4 . . . ) extend in the first direction X. In the example shown in FIG. 5, the plurality of scanning lines G1 to G4 extend linearly in the first direction X, but may be bent. The plurality of scanning lines G1 to G4 are arranged at regular intervals in the second direction Y. The plurality of scanning lines G are, for example, molybdenum-tungsten alloy films. FIG. 5 shows a plurality of sub-pixels SP (SP11, SP12, SP13, SP21, SP22, SP23, SP31, SP32, SP33 . . . ) partitioned by a plurality of signal lines S and a plurality of scanning lines G. In the example shown in FIG. 5, the sub-pixel SP11 corresponds to the opening PA11, the sub-pixel SP12 corresponds to the opening PA12, and the sub-pixel SP 13 corresponds to the opening PA13. The sub-pixel SP21 corresponds to the opening PA21, the sub-pixel SP22 corresponds to the opening PA22, and the sub-pixel SP23 corresponds to the opening PA23. The sub-pixel SP31 corresponds to the opening PA31, the sub-pixel SP32 corresponds to the opening PA32, and the sub-pixel SP33 corresponds to the opening PA33. The pitch of the sub-pixels in the second direction Y is several μm, for example, is in a range of 7 to 9 μm.

The pixel electrodes PE (PE11, PE12, PE13, PE21, PE22, PE23, PE31, PE32, PE33 . . . ) are disposed in the sub-pixels SP (SP11, SP12, SP13, SP21, SP22, SP23, SP31, SP32, SP33 . . . ). The pixel electrodes PE overlap the openings PA. In the example shown in FIG. 5, the pixel electrode PE11 is disposed in the sub-pixel SP11. The pixel electrode PE11 overlaps the opening PA11. The pixel electrode PE12 overlaps the opening PA12. The pixel electrode PE13 overlaps the opening PA13. The pixel electrode PE21 overlaps the opening PA21. The pixel electrode PE22 overlaps the opening PA12. The pixel electrode PE22 overlaps the opening PA22. The pixel electrode PE23 overlaps the opening PA23. The pixel electrode PE31 overlaps the opening PA31. The pixel electrode PE32 overlaps the opening PA32. The pixel electrode PE33 overlaps the opening PA33. The pixel electrodes PE11, PE12, and PE13 are arranged at regular intervals in the second direction Y. The pixel electrodes PE21, PE22, and PE23 are arranged at regular intervals in the second direction Y. The pixel electrodes PE31, PE32, and PE33 are arranged at regular intervals in the second direction Y. The pixel electrodes PE11, PE21, and PE31 are arranged at regular intervals in the first direction X. The pixel electrodes PE12, PE22, and PE32 are arranged at regular intervals in the first direction X. The pixel electrodes PE13, PE23, and PE33 are arranged at regular intervals in the first direction X. In the example shown in FIG. 5, each of the pixel electrodes PE11 to 13 is located between the signal lines S1 and S2 in the first direction X. Incidentally, a portion of each of the pixel electrodes PE11 to 13 may overlap at least one of the signal lines S1 and S2. Each of the pixel electrodes PE21 to PE23 is located between the signal lines S2 and S3 in the first direction X. Incidentally, a portion of each of the pixel electrodes PE21 to 23 may overlap at least one of the signal lines S2 and S3. Each of the pixel electrodes PE11, PE21, and PE31 is disposed over the scanning lines G1 and G2 in the second direction Y. A portion of each of the pixel electrodes PE11, PE21, and PE31 overlaps the scanning lines G1 and G2. Incidentally, a part of each of the pixel electrodes PE11, PE21, and PE31 may not overlap at least one of the scanning lines G1 and G2. Each of the pixel electrodes PE12, PE22, and PE32 is disposed over the scanning lines G1 and G2 in the second direction Y. A portion of each of the pixel electrodes PE12, PE22, and PE32 overlaps the scanning lines G2 and G3. Incidentally, a part of each of the pixel electrodes PE12, PE22, and PE32 may not overlap at least one of the scanning lines G2 and G3. Each of the pixel electrodes PE13, PE23, and PE33 is disposed over the scanning lines G1 and G2 in the second direction Y. A portion of each of the pixel electrodes PE13, PE23, and PE33 overlaps the scanning lines G3 and G4. Incidentally, a part of each of the pixel electrodes PE13, PE23, and PE33 may not overlap at least one of the scanning lines G3 and G4.

Each of the pixel electrodes PE has a rectangular flat plate shape without a slit or the like. Incidentally, for example, the pixel electrode PE has a rectangular flat plate shape without a slit or the like, but may have a shape with a slit or the like or may have a shape other than the rectangular shape. In the example shown in FIG. 5, the pixel electrode PE11 includes a side PES1, a side PES2 on the opposite side of the PES1 in the first direction X, a side PES3 intersecting the sides PES1 and PES2, and a side PES4 on the opposite side of the PES3 in the second direction Y. The side PES1 and the side PES2 are opposed to each other. The side PES2 is spaced apart from the side PES1 on the tip side of the arrow in the first direction X. The side PES3 and the side PES4 are opposed to each other. The side PES4 is spaced apart from the side PES3 on the tip side of the arrow in the second direction Y. In the example shown in FIG. 5, the side PES1 overlaps the boundary PAST in the first direction X. In the first direction X, the side PES2 is located on the outer side with respect to the boundary PAS2. In other words, the lateral width of the pixel electrode PE11 is larger than the lateral width of the opening PA11. In the second direction Y, the side PES3 is located on the outer side with respect to the boundary PAS3, and the side PES4 is located on the outer side with respect to the boundary PAS4. In other words, the longitudinal width of the pixel electrode PE11 is larger than the longitudinal width of the opening PA11. In addition, in the second direction Y, the central portion between the sides PES3 and PES4 of the pixel electrode PE11 overlaps the central portion between the boundaries PAS3 and PAS4 of the opening PA11. In other words, the central portion of the longitudinal width of the pixel electrode PE11 and the central portion of the longitudinal width of the opening PA11 overlap each other. Incidentally, the central portion of the longitudinal width of the pixel electrode PE11 and the central portion of the longitudinal width of the opening PA11 may not overlap each other. Incidentally, for convenience of description, the configuration of the pixel electrode PE has been described using the pixel electrode PE11, but the same configuration as the pixel electrode PE11 can be applied to the pixel electrodes PE other than the pixel electrode PE11.

The common electrode CE1 is disposed over the plurality of sub-pixels SP. In the example shown in FIG. 5, the common electrode CE1 extends in the X-Y plane. In other words, the common electrode CE1 is disposed in a solid manner on the X-Y plane. The common electrode CE1 overlaps each pixel electrode PE in each sub-pixel SP.

The common electrode CE2 is disposed over the plurality of sub-pixels SP. The common electrode CE2 has a plurality of shaft portions AX (AX1, AX2, AX3 . . . ) and branch portions BR (BR11, BR12, BR13, BR14, BR15, BR21, BR22, BR23, BR24, BR25, BR31, B32, BR33, BR34, BR35 . . . ).

The plurality of shaft portions AX extend in the second direction Y. In the example shown in FIG. 5, the plurality of shaft portions AX extend linearly in the second direction Y, but may be bent. The plurality of shaft portions AX are arranged at regular intervals in the first direction. In other words, a slit is formed between two shaft portions adjacent to each other in the first direction X. In the example shown in FIG. 5, the shaft portions AX1, AX2, and AX3 are disposed at regular intervals in this order toward the tip of the arrow in the first direction X. For example, the shaft portions AX1 to AX3 are arranged at regular intervals in the first direction X. Each shaft portion AX overlaps each signal line S. For example, the shaft portion AX1 overlaps the signal line S1. The shaft portion AX2 overlaps the signal line S2. The shaft portion AX3 overlaps the signal line S3. For example, the lateral width of the shaft portion AX is smaller than the lateral width of the signal line S. Incidentally, the plurality of shaft portions AX are electrically connected in the non-display region NDA, for example. Hereinafter, the "arrangement and configuration of the shaft portion AX with respect to the members of the display device DSP such as the common electrode CE, the pixel electrode PE, the opening PA, the signal line S, and the scanning line G" may be simply referred to as a "configuration of the shaft portion AX".

The plurality of branch portions BR extend in the first direction X from each shaft portion AX. In other words, the plurality of branch portions BR are connected to each shaft portion AX and extend in the first direction X from each shaft portion AX. In addition, in each shaft portion AX, the plurality of branch portions BR are arranged at intervals in the second direction Y. In the example shown in FIG. 5, the branch portions BR11, BR12, BR13, BR14, and BR15 extend from the shaft portion AX1 toward the tip of the arrow in the first direction X. The branch portions BR11 to BR15 are spaced apart from the shaft portion AX2 in the first direction X. In the shaft portion AX1, the branch portions BR11 to BR15 are arranged at intervals in this order toward the tip of the arrow in the second direction Y. In the shaft portion AX1 shown in FIG. 5, the odd-numbered branch portions BR11, BR13, and BR15 overlap the openings PA11, PA12, and PA13, respectively. In other words, the odd-numbered branch portions BR11, BR13, and BR15 are disposed in the sub-pixels SP11, SP12, and SP13, respectively. In addition, the shaft portion AX1 shown in FIG. 5, the even-numbered branch portions BR12 and BR14 do not overlap the openings PA. In other words, the shaft portion AX1 shown in FIG. 5, the even-numbered branch portions BR12 and BR14 overlap the scanning lines G2 and G3, respectively.

In the example shown in FIG. 5, the branch portions BR21, BR22, BR23, BR24, and BR25 extend from the shaft portion AX2 toward the tip of the arrow in the first direction X. The branch portions BR21 to BR25 are spaced apart from the shaft portion AX3 in the first direction X. In the shaft portion AX2, the branch portions BR21 to BR25 are arranged at intervals in this order toward the tip of the arrow in the second direction Y. In the shaft portion AX2 shown in FIG. 5, the odd-numbered branch portions BR21, BR23, and BR25 overlap the openings PA21, PA22, and PA23, respectively. In other words, the odd-numbered branch portions BR21, BR23, and BR25 are disposed in the sub-pixels SP21, SP22, and SP23, respectively. In the shaft portion AX2 shown in FIG. 5, the even-numbered branch portions BR22 and BR24 do not overlap the openings PA. In other words, in the shaft portion AX2 shown in FIG. 5, the even-numbered branch portions BR22 and BR24 overlap the scanning lines G2 and G3, respectively.

In the example shown in FIG. 5, the branch portions BR31, BR32, BR33, BR34, and BR35 extend from the shaft portion AX3 toward the tip of the arrow in the first direction X. In the shaft portion AX3, the branch portions BR31 to BR35 are arranged at intervals in this order toward the tip of the arrow in the second direction Y. In the shaft portion AX3 shown in FIG. 5, the odd-numbered branch portions BR31, BR33, and BR35 overlap the openings PA31, PA32, and PA33, respectively. In other words, the odd-numbered branch portions BR31, BR33, and BR35 are arranged in the sub-pixels SP31, SP32, and SP33, respectively. The branch portions BR32 and BR34 do not overlap the openings PA. In other words, the branch portions BR32 and BR34 overlap the scanning lines G2 and G3, respectively. Hereinafter, the "arrangement and configuration of the branch portion BR with respect to the members of the display device DSP such as the common electrode CE, the pixel electrode PE, the opening PA, the signal line S, and the scanning line G" may be simply referred to as a "configuration of the branch portion BR".

In FIG. 5, the configurations of the shaft portions AX1 to AX3 are the same. For the configurations of the odd-numbered branch portions BR (BR11, BR13, BR15, BR21, BR23, BR25, BR31, BR33, and BR35) are the same. The configurations of the openings PA (PA11, PA13, PA15, PA21, PA23, PA25, PA31, PA33, and PA35) are the same. In addition, in FIG. 5, the configurations of the even-numbered branch portions BR (BR12, BR14, BR22, BR24, BR32, and BR34) are the same. In other words, as shown in FIG. 5, the configurations of the plurality of branch portions BR are alternately the same in the second direction Y. In other words, the configurations of the two branch portions BR adjacent to each other in the second direction Y are different. Incidentally, "the same", "identical", and "equivalent" indicate that physical quantities, materials, configurations (structures), and the like of a plurality of target objects, spaces, regions, and the like are completely the same, as well as being slightly different to the extent that they can be regarded as being substantially the same.

Hereinafter, the configuration of the branch portion BR will be described using a predetermined shaft portion AX, for example, at least one odd-numbered branch portion BR of the shaft portion AX1, for example, the branch portion BR11 and at least one even-numbered branch portion BR of the shaft portion AX2, for example, the branch portion BR12. However, the same configuration as the predetermined odd-numbered branch portion BR, for example, the branch portion BR11 can be applied to a predetermined odd-numbered branch portion BR, for example, the odd-numbered branch portion BR other than the branch portion BR11, and the same configuration as the predetermined even-numbered branch portion BR, for example, the branch portion BR12 can be applied to a predetermined even-numbered branch portion BR, for example, the even-numbered branch portion BR other than the branch portion BR12. In addition, the same configuration as the predetermined shaft portion AX, for example, the shaft portion AX1 can be applied to a predetermined shaft portion AX, for example, other shaft portions AX other than the shaft portion AX1.

Figure 6:
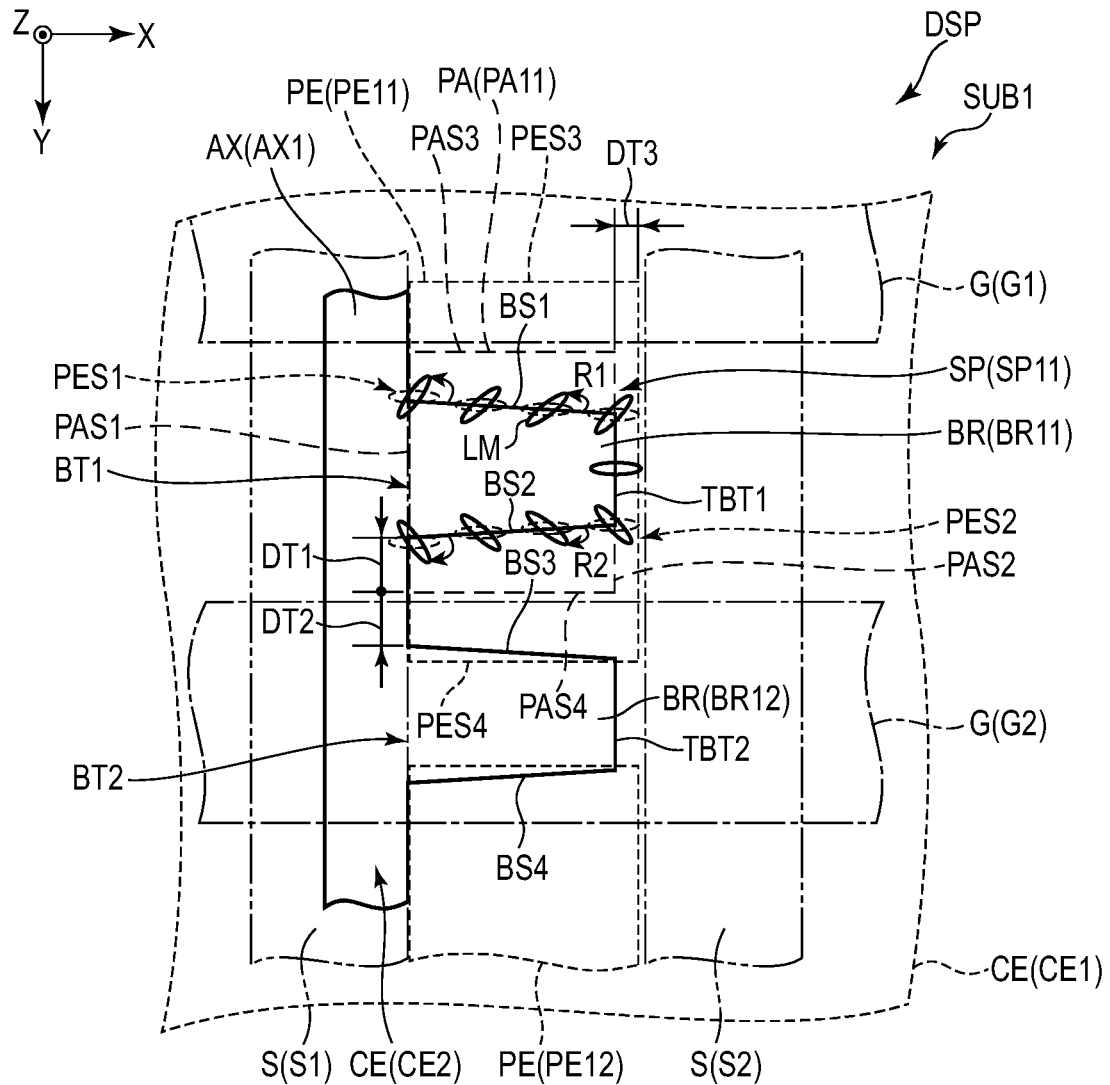
FIG. 6 is an enlarged view of branch portions shown in FIG. 5.

FIG. 6 is an enlarged view of the branch portions BR shown in FIG. 5. In the example shown in FIG. 6, the branch portion BR11 is disposed in the sub-pixel SP11 partitioned by the signal lines S1 and S2 and the scanning lines G1 and G2. In other words, the branch portion BR11 overlaps the common electrode CE1, the pixel electrode PE11, and the opening PA11 surrounded by the signal lines S1 and S2 and the scanning lines G1 and G2. The branch portion BR11 is formed in a trapezoidal shape tapered from a proximal part (lower base) BT1 connected to the shaft portion AX1 toward an upper base TBT1 located on the tip side of an arrow in the first direction X. The lower base BT1 and the upper base TBT1 are opposed to each other in the first direction X. The branch portion BR11 has a side BS1 and a side BS2. In FIG. 6, the side BS1 extends from one end portion of the lower base BT1 to one end portion of the upper base TBT1, and the side BS2 extends from the other end portion of the lower base BT1 on the opposite side of the one end portion of the lower base BT1 to the other end portion of the upper base TBT1 on the opposite side of the one end portion of the upper base TBT1. The side BS1 and the side BS2 are opposed to each other in the second direction Y. The side BS2 is located on the tip side of an arrow in the second direction Y with respect to the side BS1. In other words, the side BS2 is located on the branch portion BR12 side with respect to the side BS1. For example, the lengths of the sides BS1 and BS2 are the same. The side BS1 and the side BS2 are angled at the same angle. Incidentally, the side BS1 and the side BS2 may be angled at different angles.

In the example shown in FIG. 6, the lower base BT1 of the branch portion BR11 overlaps the side PES1 of the pixel electrode PE11 and the boundary PAS1 of the opening PA11. Incidentally, the lower base BT1 may not overlap the side PES11 and may not overlap the boundary PAS1. The upper base TBT1 is located on the shaft portion AX1 side with respect to the side PES2 of the pixel electrode PE11. In other words, the upper base TBT1 is located on the inner side with respect to the side PES2. For example, the upper base TBT1 is spaced apart from the side PES2 by a distance DT3 and located on the shaft portion AX1 side with respect to the side PES2. In other words, the pixel electrode PE11 extends to the distal end side of the arrow in the first direction X with respect to the upper base TBT1 of the branch portion BR11. Since the pixel electrode PE11 is located on the outer side with respect to the upper base TBT1 in the first direction X, it is possible to improve the stability of the alignment of liquid crystal molecules in the vicinity of the upper base TBT1. The upper base TBT1 overlaps the boundary PAS2 of the opening PA11. The upper base TBT1 may not overlap the boundary PAS2. The sides BS1 and BS2 are located on the inner side of the opening PA11 in the second direction Y. In other words, the side BS1 and the side BS2 overlap the opening PA11. The sides BS1 and BS2 are located between the boundaries PAS3 and PAS4 of the opening PA11 in the second direction Y. A point of intersection of the side BS2 and the lower base BT1 is spaced apart from the boundary PAS4 by a distance DT1 in the second direction Y on the inner side of the opening PA11. In this case, the point of intersection of the side BS1 and the lower base BT1 is spaced apart from the boundary PAS3 by the distance DT1 in the second direction Y.

In the example shown in FIG. 6, the branch portion BR12 overlaps the scanning line G2. The branch portion BR12 is disposed from the pixel electrode PE11 to the pixel electrode PE12. A part of the branch portion BR12 overlaps the pixel electrodes PE11 and PE12. The branch portion BR12 is formed in a trapezoidal shape tapered from a proximal part (lower base) BT2 connected to the shaft portion AX1 toward an upper base TBT2 located on the tip side of the arrow in the first direction X. The lower base BT2 and the upper base TBT2 are opposed to each other in the first direction X. The branch portion BR12 has a side BS3 and a side BS4. In FIG. 6, the side BS3 extends from one end portion of the lower base BT2 to one end portion of the upper base TBT2, and the side BS4 extends from the other end portion of the lower base BT2 on the opposite side of the one end portion of the lower base BT2 to the other end portion of the upper base TBT2 on the opposite side of the one end portion of the upper base TBT2. The side BS3 and the side BS4 are opposed to each other in the second direction Y. The side BS3 is located on the side opposite to the tip side of the arrow in the second direction Y with respect to the side BS4. In other words, the side BS3 is located on the branch portion BR11 side with respect to the side BS4. The side BS3 and the side BS4 are angled at the same angle. Incidentally, the sides BS3 and BS4 may be angled at different angles. In the example shown in FIG. 5, the side BS3 overlaps the pixel electrode PE11. The side BS4 overlaps the pixel electrode PE12. A point of intersection of the side BS3 and the lower base BT2 is located on the outer side with respect to the boundary PAS4 of the opening PA11 in the second direction Y. The point of intersection of the side BS3 and the lower base BT2 is spaced apart from the boundary PAS4 by a distance DT2 in the second direction Y on the inner side of the opening PA11. For example, the distances DT1 and DT2 are the same. Incidentally, the distance DT1 may be shorter than the distance DT2. For example, in a case where a high-speed response mode in which a response speed is higher than that of a general fringe field switching (FFS) mode is implemented, it is desirable that the distance DT1 and the distance DT2 be the same or the distance DT1 be shorter than the distance DT2 so that a black line that can be generated between two branch portions BR adjacent to each other in the second direction Y does not enter the opening PA.

The display device DSP can implement a high-speed response mode in which a response speed is higher than that of a general fringe field switching (FFS) mode. The response speed is defined as, for example, a speed at which the light transmittance of the liquid crystal layer LC is changed between predetermined levels by voltage application between the pixel electrodes PE and the common electrodes CE. In the generally widely used fringe field switching (FFS) mode, when a fringing field is formed between two electrodes, all the liquid crystal molecules rotate in an identical direction. However, the rotation of the liquid crystal molecules in the high-speed response mode is different from the rotation of the liquid crystal molecules in the fringe field switching (FFS) mode. In the example shown in FIG. 6, when a voltage is applied to the pixel electrode PE11 and the common electrode CE2, liquid crystal molecules LM in the vicinity of the side BS1 from a point of intersection of the side BS1 and the lower base BT1 to a point of intersection of the side BS1 and the upper base TBT1 rotate in a first rotational direction R1. In other words, in the vicinity of the side BS1, the rotational directions of the liquid crystal molecules LM from the proximal part BT1 to the upper base TBT1 are aligned in the first rotational direction R1. When a voltage is applied to the pixel electrode PE11 and the common electrode CE2, liquid crystal molecules LM in the vicinity of the side BS2 from a point of intersection of the side BS2 and the lower base BT1 to a point of intersection of the side BS2 and the upper base TBT1 rotate in a second rotational direction R2 opposite to the first rotational direction R1. In other words, in the vicinity of the side BS2, the rotational directions of the liquid crystal molecules LM from the proximal part BT1 to the upper base TBT1 are aligned in the second rotational direction R2. When a voltage is applied to the pixel electrode PE11 and the common electrode CE2, liquid crystal molecules LM in the vicinity of the side BS3 from a point of intersection of the side BS3 and the lower base BT2 to a point of intersection of the side BS3 and the upper base TBT2 rotate in the first rotational direction R1. In other words, in the vicinity of the side BS3, the rotational directions of the liquid crystal molecules LM from the proximal part BT2 to the upper base TBT2 are aligned in the first rotational direction R1. Incidentally, liquid crystal molecules LM rotating in the first rotational direction R1 and liquid crystal molecules LM rotating in the second rotational direction R2 are antagonistic to each other at a central portion of the branch portions BR11 and BR12 in the second direction Y, an intermediate portion between the branch portions BR11 and BR12 in the second direction Y, and the like. For this reason, in the region where the liquid crystal molecules rotating in the first rotational direction R1 and the liquid crystal molecules LM rotating in the second rotational direction R2 are antagonistic to each other, the liquid crystal molecules LM are maintained in the initial aligned state and hardly rotate. As described above, in the high-speed response mode, the rotational directions of the liquid crystal molecules LM alternately change at the sides of each branch portion BR in the second direction. In addition, as shown in FIG. 6, in the branch portion BR11, since the sides BS1 and BS2 intersect with the alignment treatment direction, for example, at an angle other than the right angle with respect to the first direction X, when a voltage is applied to the pixel electrode PE11 and the common electrode CE2, the direction of the generated electric field intersects with the alignment treatment direction at an angle other than the right angle, so that the rotational directions of the liquid crystal molecules can be made substantially constant at each of the sides BS1 and BS2. For this reason, when a voltage is applied to the pixel electrode and the common electrode CE, variations in the rotational directions of the liquid crystal molecules can be suppressed to improve the alignment stability.

According to the present embodiment, the display device DSP includes the first substrate SUB1 and the second substrate SUB2 opposed to the first substrate SUB2. The first substrate SUB1 includes the pixel electrodes PE, the common electrode CE1, the common electrode CE2, and the openings PA surrounded by the signal lines S and the scanning lines G. The common electrode CE2 includes the shaft portions AX extending in the second direction Y and the plurality of branch portions BR extending in the first direction from the shaft portion AX. The plurality of branch portions BR are arranged at regular intervals in the second direction. One branch portion BR among the plurality of branch portions BR overlaps the opening PA, the pixel electrode PE, and the common electrode CE1. The branch portion BR adjacent to the branch portion BR overlapping the opening PA, the pixel electrode PE, and the common electrode CE1 in the second direction Y overlaps the pixel electrode PE and the scanning line G. In other words, this branch portion BR does not overlap the opening PA. For this reason, the display device DSP can implement high definition and have an improved response speed. Therefore, it is possible to provide the display device DSP capable of displaying a high-quality image.

Next, display devices DSP according to modified examples and other embodiments will be described. In the modified examples and other embodiments described below, the same parts as those of the display device DSP according to the first embodiment described above are denoted by the same reference numerals, and the detailed description thereof will be omitted or simplified, and parts different from those of the display device DSP according to the first embodiment will be mainly described in detail. Incidentally, in the other embodiments, the same effects as those of the above-described embodiment can be obtained.

Modified Example 1

A display device DSP according to Modified Example 1 of the first embodiment is different from the display device DSP according to the first embodiment in the configuration of sub-pixels SP.

Figure 7:
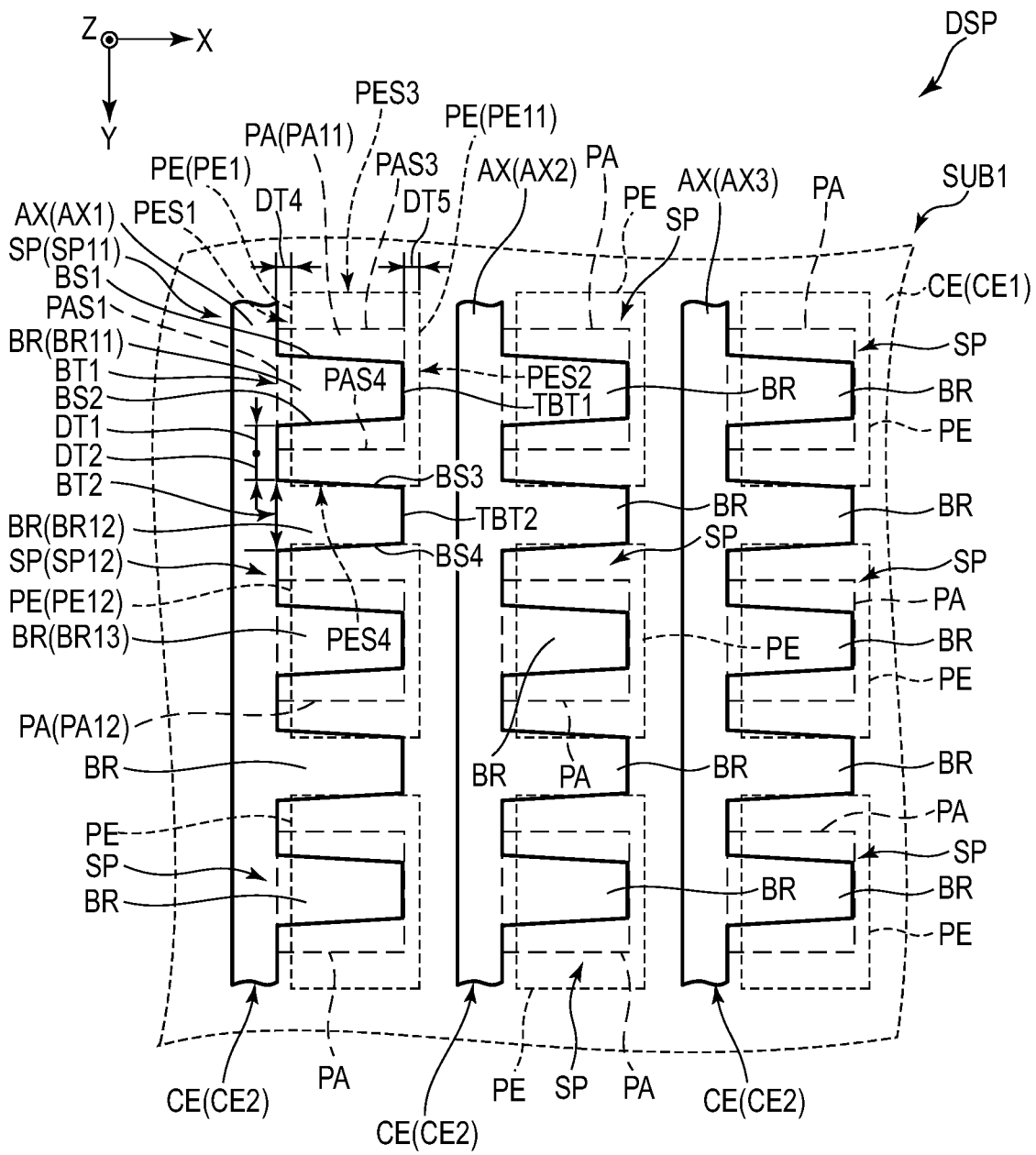
FIG. 7 is a plan view schematically showing a configuration example of a first substrate of a display device according to Modified Example 1.

FIG. 7 is a plan view schematically showing a configuration example of a first substrate SUB1 of the display device DSP according to Modified Example 1. FIG. 7 shows only configurations necessary for description. A configuration of a pixel electrode PE11 shown in FIG. 7 corresponds to a configuration in which the pixel electrode PE11 shown in FIG. 5 is shifted by a distance DT4 in the first direction X.

A pixel electrode PE is spaced apart from a shaft portion AX on the tip side of an arrow in the first direction X. In the example shown in FIG. 7, the pixel electrode PE11 is spaced apart from a shaft portion AX1 toward a shaft portion AX2 side by the distance DT4. In addition, the pixel electrode PE11 is spaced apart from an upper base TBT1 of a branch portion BR11 toward the shaft portion AX2 side by a distance DT3. The lateral width of the branch portion BR11 shown in FIG. 7 is longer than the lateral width of the branch portion BR11 shown in FIG. 5. The lateral width of the branch portion BR11 shown in FIG. 7 is longer than the lateral width of the branch portion BR11 shown in FIG. 5 by the distance DT4. In addition, the lateral width of each opening PA shown in FIG. 7 is longer than the lateral width of each opening PA shown in FIG. 5. For example, the lateral width of an opening PA11 shown in FIG. 7 is longer than the lateral width of the opening PA11 shown in FIG. 5 by the distance DT4.

Modified Example 1 also has effects similar to those of the first embodiment. In addition, in Modified Example 1, the lateral widths of the openings PA can be increased. For this reason, it is possible to improve the light transmittance of a display panel PNL.

Modified Example 2

A display device DSP according to Modified Example 2 of the first embodiment is different from the display device DSP according to the first embodiment in the configuration of branch portions BR.

Figure 8:
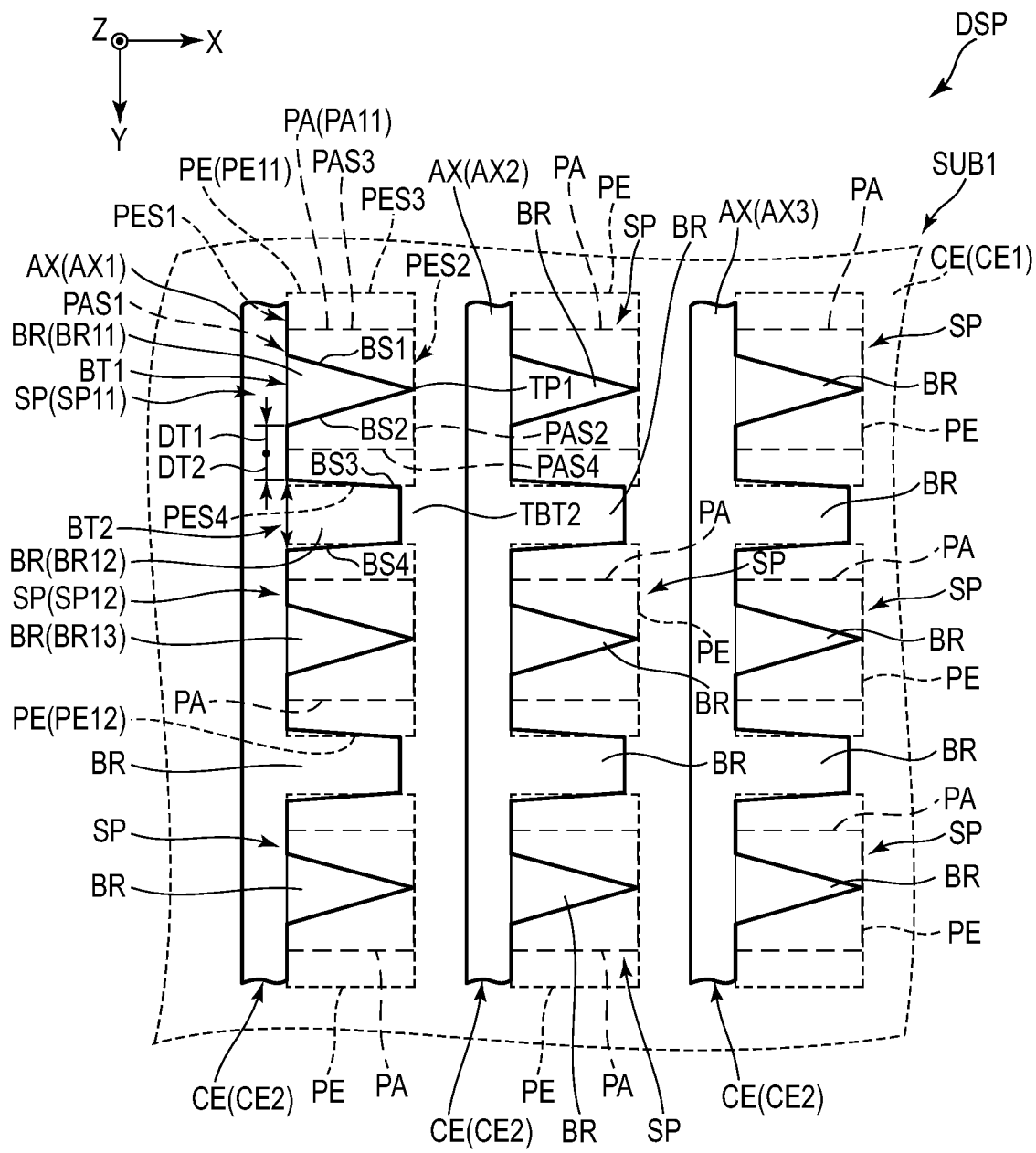
FIG. 8 is a plan view schematically showing a configuration example of a first substrate of a display device according to Modified Example 2.

FIG. 8 is a plan view schematically showing a configuration example of a first substrate SUB1 of the display device DSP according to Modified Example 2. FIG. 8 shows only configurations necessary for description.

In the example shown in FIG. 8, a branch portion BR11 is formed in a trapezoidal shape tapered from a proximal part (bottom side) BT1 connected to a shaft portion AX1 toward a vertex TP1 located on the tip side of an arrow in the first direction. The bottom side BT1 and the vertex TP1 are opposed to each other in the first direction X. In FIG. 8, a side BS1 extends from one end portion of the bottom side BT1 to the vertex TP1, and a side BS2 extends from the other end portion of the bottom side BT1 on the opposite side of the one end portion of the bottom side BT1 to the vertex TP1. The vertex TP1 overlaps a side PES2 of a pixel electrode PE11. In other words, the pixel electrode PE11 is disposed from the bottom side BT1 to the vertex TP1 in the first direction X. A boundary PAS2 of an opening PA overlaps a side PES2 of the pixel electrode PE11. In other words, the lateral width of the opening PA11 shown in FIG. 8 is longer than the lateral width of the opening PA shown in FIG. 5. For example, the lateral width of the opening PA11 shown in FIG. 8 is longer than the lateral width of the opening PA shown in FIG. 5 by a distance DT3.

Modified Example 2 also has effects similar to those of the first embodiment. In addition, in Modified Example 2, the lateral widths of openings PA can be increased. For this reason, it is possible to improve the light transmittance of a display panel PNL.

Modified Example 3

A display device DSP according to Modified Example 3 of the first embodiment is different from the display device DSP according to the first embodiment in the configuration of branch portions BR.

Figure 9:
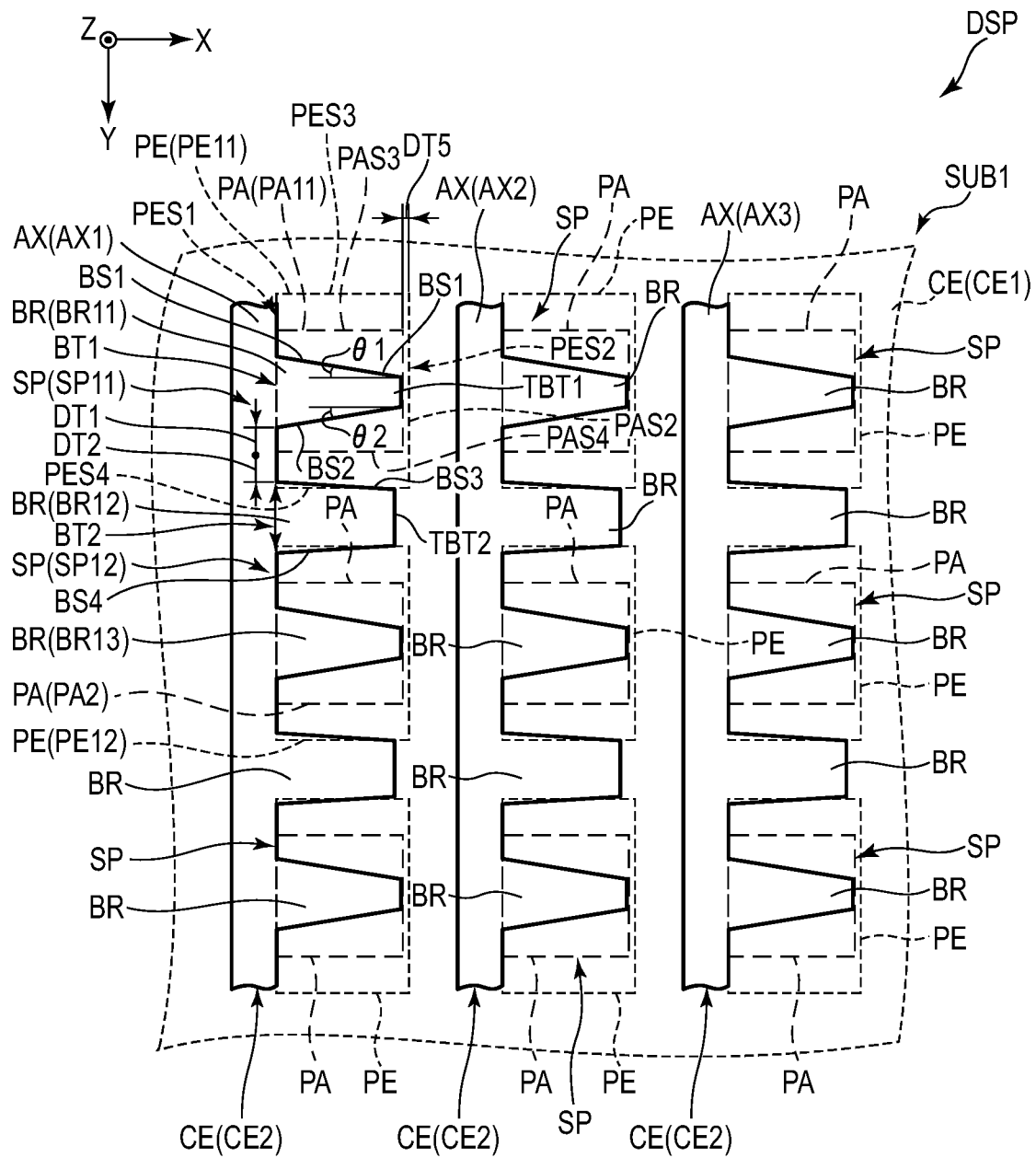
FIG. 9 is a plan view schematically showing a configuration example of a first substrate of a display device according to Modified Example 3.

FIG. 9 is a plan view schematically showing a configuration example of a first substrate SUB1 of the display device DSP according to Modified Example 3. FIG. 9 shows only configurations necessary for description.

In the example shown in FIG. 9, a side BS1 is angled at an angle $\theta 1$ with respect to a straight line perpendicular to an upper base TBT1. A side BS2 is angled at an angle $\theta 2$ with respect to the straight line perpendicular to the upper base TBT1. The angles $\theta 1$ and $\theta 2$ are, for example, larger than 0 degrees and equal to or smaller than 10 degrees. The angles $\theta 1$ and $\theta 2$ may be the same or different. For example, the upper base TBT1 is spaced apart from a side PES2 of a pixel electrode PE11 by a distance DT5 and located on the shaft portion AX1 side with respect to the side PES2 of the pixel electrode PE11. For example, when $\theta 1$ and $\theta 2$ are 0 degrees, the distance DT5 is 0.5 μm. When $\theta 1$ and $\theta 2$ are 5 degrees, the distance DT5 is 0.25 μm. In addition, when $\theta 1$ and $\theta 2$ are 10 degrees, the distance DT5 is 0 μm. For example, the distance DT5 may be shorter than the distance DT3. The lateral width of a branch portion BR11 shown in FIG. 9 is longer than the lateral width of the branch portion BR11 shown in FIG. 5. In addition, the lateral width of each opening PA shown in FIG. 9 is longer than the lateral width of the opening PA shown in FIG. 5.

Modified Example 3 also has effects similar to those of the first embodiment. In addition, in Modified Example 3, the lateral widths of openings PA can be increased. For this reason, it is possible to improve the light transmittance of a display panel PNL.

Modified Example 4

A display device DSP according to Modified Example 4 of the first embodiment is different from the display device DSP according to the first embodiment in the configuration of the shaft portions AX and the branch portions BR.

Figure 10:
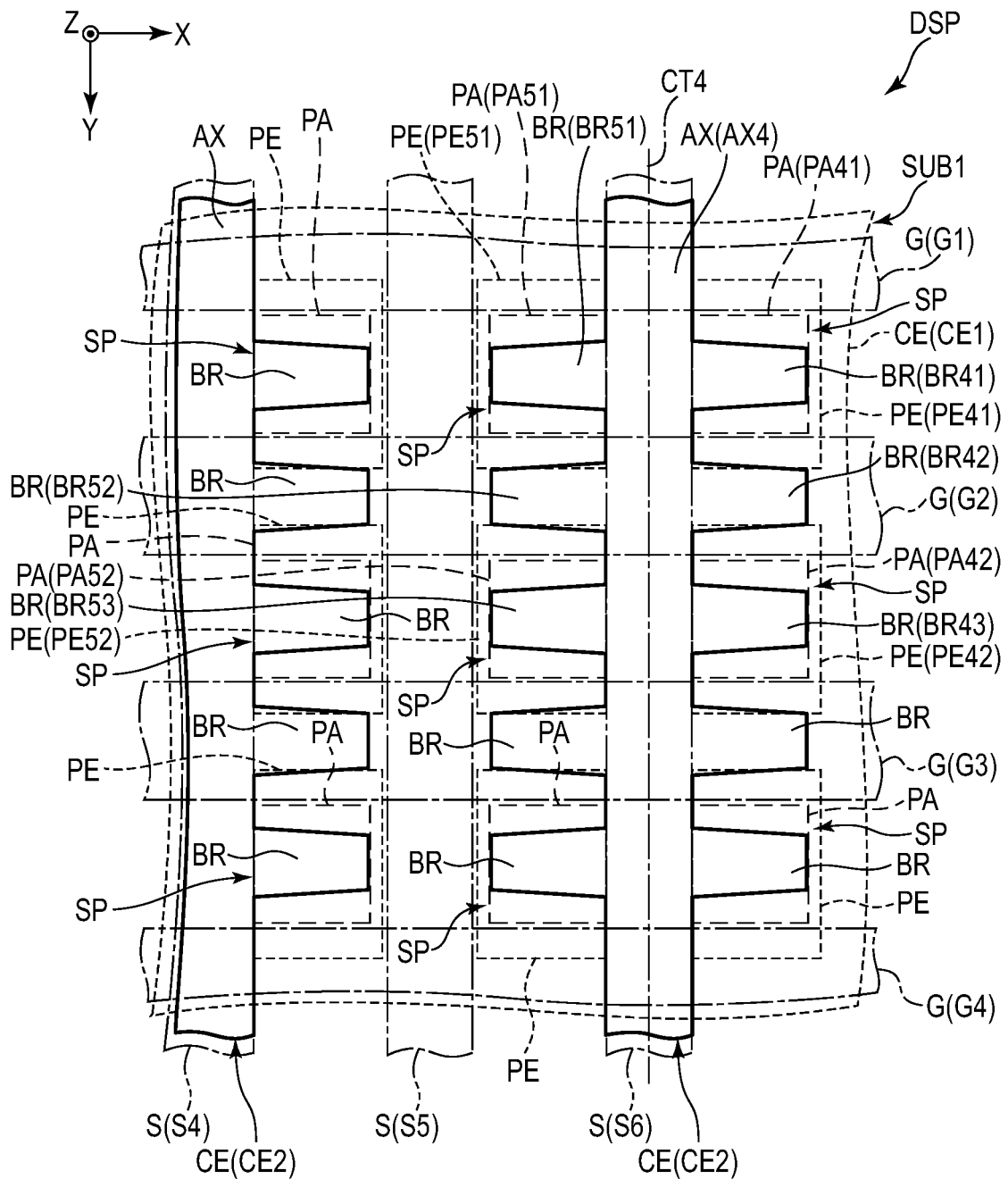
FIG. 10 is a plan view schematically showing a configuration example of a first substrate of a display device according to Modified Example 4.

FIG. 10 is a plan view schematically showing a configuration example of a first substrate SUB1 of the display device DSP according to Modified Example 4. FIG. 10 shows only configurations necessary for description.

In the example shown in FIG. 10, a plurality of signal lines S4 to S6 are arranged at regular intervals in the first direction X. A pixel electrodes PE41 overlaps an opening PA41. A pixel electrodes PE42 overlaps an opening PA42. A pixel electrodes PE51 overlaps an opening PA51. A pixel electrodes PE52 overlaps an opening PA52. The pixel electrodes PE41 and PE42 are arranged at regular intervals in the second direction Y. The pixel electrodes PE51 and PE52 are arranged at regular intervals in the second direction Y. The pixel electrodes PE41 and PE51 are arranged at regular intervals in the first direction X. The pixel electrodes PE41 and PE51 are disposed symmetrically with respect to a signal line S6 in the first direction X. In addition, the openings PA41 and PA51 are disposed symmetrically with respect to the signal line S6 in the first direction X. The pixel electrodes PE42 and PE52 are arranged at regular intervals in the first direction X. The pixel electrodes PE42 and PE52 are disposed symmetrically with respect to the signal line S6 in the first direction X. In addition, the openings PA42 and PA52 are disposed symmetrically with respect to the signal line S6 in the first direction X.

A shaft portion AX4 overlaps the signal line S6. An odd-numbered branch portion BR41, an even-numbered branch portion BR42, and an odd-numbered branch portion BR43 extend from the shaft portion AX4 toward the tip of an arrow in the first direction X. The branch portions BR41, BR42, and BR43 are arranged at intervals in this order toward the tip of an arrow in the second direction Y. An odd-numbered branch portion BR51, an even-numbered branch portion BR52, and an odd-numbered branch portion BR53 extend toward the side opposite to the branch portion BR41, the branch portion BR42, and the branch portion BR43 in the first direction X, respectively. The branch portions BR51, BR52, and BR53 are arranged at intervals in this order toward the tip of the arrow in the second direction Y.

The branch portion BR41 and the branch portion BR43 are substantially the same as the configuration of the branch portion BR11 shown in FIG. 5. The branch portion BR51 is provided symmetrically with the branch portion BR41 with respect to the central axis CT4 (hereinafter, it is simply referred to as a central axis CT4) of the shaft portion AX4 in the first direction X. The branch portion BR53 is provided symmetrically with the branch portion BR43 with respect to the central axis CT4 of the shaft portion AX4. The branch portion BR42 has substantially the same configuration as that of the branch portion BR12 shown in FIG. 5. The branch portion BR52 is provided symmetrically with the branch portion BR42 with respect to the central axis CT4 of the shaft portion AX4.

Modified Example 3 also has effects similar to those of the first embodiment.

Modified Example 5

A display device DSP according to Modified Example 5 of the first embodiment is different from the display device DSP according to the first embodiment in the configuration of the branch portions BR.

Figure 11:
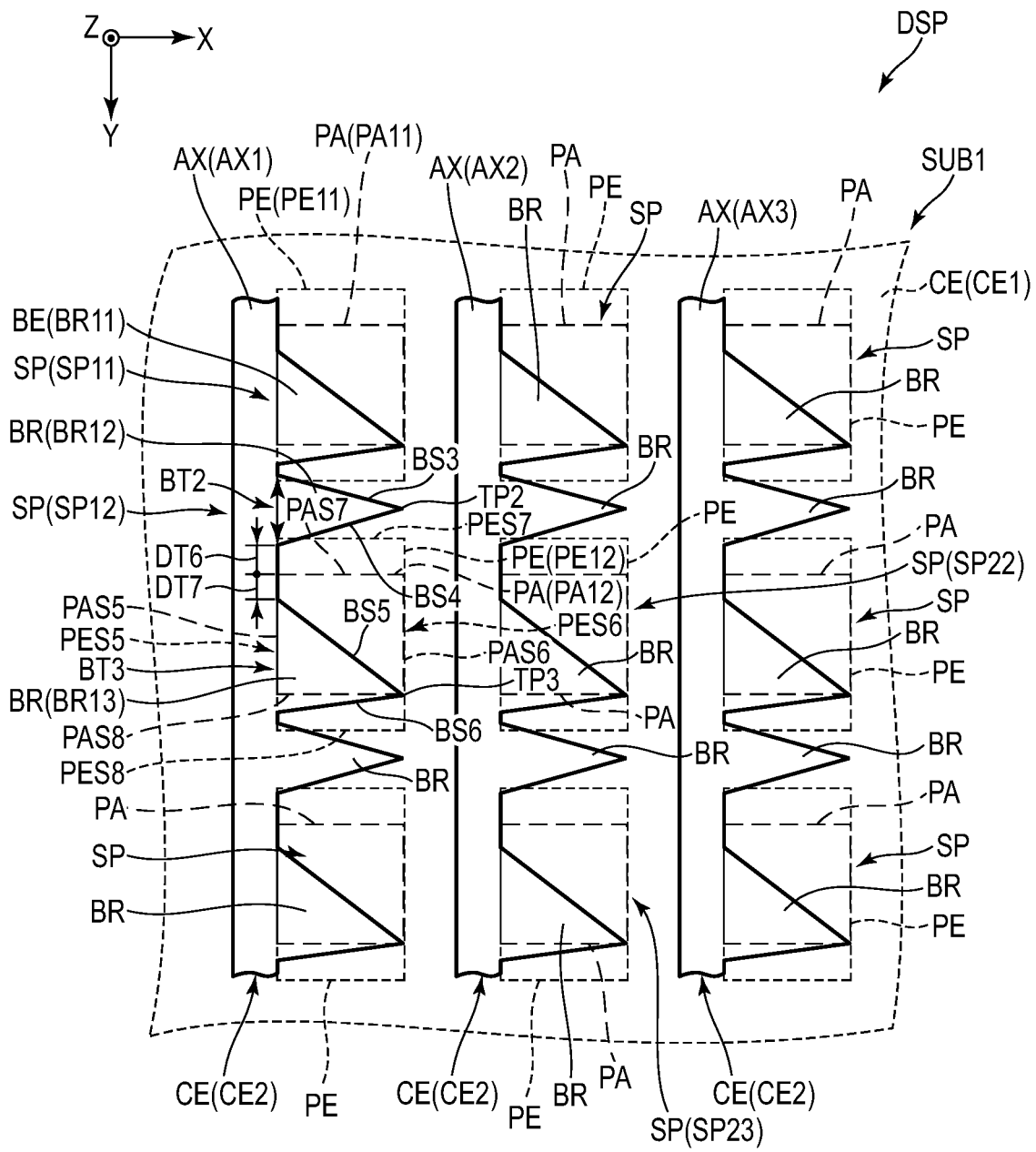
FIG. 11 is a plan view schematically showing a configuration example of a first substrate of a display device according to Modified Example 5.

FIG. 11 is a plan view schematically showing a configuration example of a first substrate SUB1 of the display device DSP according to Modified Example 5. FIG. 11 shows only configurations necessary for description. In the example shown in FIG. 11, an opening PA12 includes a boundary PAS5, a boundary PAS6 located on the tip side of an arrow in the first direction X with respect to the boundary PAS5, a boundary PAS7 intersecting the boundaries PAS5 and PAS6, and a boundary PAS8 located on the tip side of an arrow in the second direction Y with respect to the boundary PAS7. The boundary PAS5 and the boundary PAS6 are opposed to each other in the first direction X. The boundary PAS7 and the boundary PAS8 are opposed to each other in the second direction Y.

In the example shown in FIG. 11, a part of a branch portion BR12 overlaps pixel electrodes PE11 and PE12. The branch portion BR12 is formed in a trapezoidal shape tapered from a proximal part (bottom side) BT2 connected to a shaft portion AX1 toward a vertex TP2 located on the tip side of an arrow in the first direction X. The bottom side BT2 and the vertex TP2 are opposed to each other in the first direction X. In FIG. 11, a side BS3 extends from one end portion of the bottom side BT2 to the vertex TP2, and a side BS4 extends from the other end portion of the bottom side BT2 on the opposite side of the one end portion of the bottom side BT2 to the vertex TP2. The side BS3 and the side BS4 are opposed to each other in the second direction Y. A portion of the side BS3 overlaps the pixel electrode PE11. In FIG. 11, a portion of the side BS3 on the bottom side BT2 side overlaps the pixel electrode PE11. A portion of the side BS4 overlaps a pixel electrode PE12. In FIG. 11, a portion of the side BS4 on the bottom side BT2 side overlaps the pixel electrode PE12. A point of intersection of the side BS4 and the bottom side BT2 is located on the outer side with respect to the boundary PAS7 of the opening PA12 in the second direction Y. The point of intersection of the side BS4 and the bottom side BT2 is spaced apart from the boundary PAS7 by a distance DT6 in the second direction Y on the inner side (branch portion BR11 side) of the opening PA12.

In the example shown in FIG. 11, a branch portion BR13 is disposed in a sub-pixel SP12 partitioned by signal lines S1 and S2 and scanning lines G2 and G3. In other words, the branch portion BR13 overlaps a common electrode CE1, the pixel electrode PE12, and the opening PA12 surrounded by signal lines S1 and S2 and scanning lines G2 and G3. The branch portion BR13 is formed in a trapezoidal shape tapered from a proximal part (bottom side) BT3 connected to the shaft portion AX1 toward a vertex TP3 located on the tip side of the arrow in the first direction X. The branch portion BR13 has a side BS5 and a side BS6. In FIG. 11, the side BS5 extends from one end portion of the lower base BT3 to the vertex TP3, and the side BS6 extends from the other end portion of the lower base BT1 on the opposite side of the one end portion of the lower base BT1 to the vertex TP3. The side BS5 and the side BS6 are opposed to each other. The side BS6 is located on the tip side of an arrow in the second direction Y with respect to the side BS5. In other words, the side BS5 is located on the branch portion BR12 side with respect to the side BS6. For example, the length of the side BS5 is longer than the length of the side BS6. The side BS5 and the side BS6 are angled at different angles. Incidentally, the sides BS5 and BS6 may be angled at the same angle.

In the example shown in FIG. 11, the bottom side BT3 of the branch portion BR13 overlaps a side PES5 of the pixel electrode PE12 and the boundary PAS5 of the opening PA12. Incidentally, the bottom side BT3 may not overlap the side PES5 and may not overlap the boundary PAS5. The vertex TP3 overlaps the boundaries PAS6 and PAS8 of the opening PA12 and a side PES6 of the pixel electrode PE12. Incidentally, the vertex TP3 may not overlap at least one of the boundaries PAS6 and PAS8 and may not overlap the side PES6. The sides BS5 and BS6 overlap the pixel electrode PE12. The side BS5 is located on the inner side of the opening PA12 in the second direction Y. In other words, the side BS5 overlaps the opening PA12. The side BS5 extends from a point of intersection of the boundary PAS6 and the boundary PAS8 to the boundary PAS5 between the boundaries PAS7 and PAS8 of the opening PA12. A point of intersection of the side BS5 and the lower base BT3 is spaced apart from the boundary PAS7 by a distance DT7 in the second direction Y on the inner side of the opening PA12. For example, the distances DT6 and DT7 are the same. Incidentally, the distance DT7 may be shorter than the distance DT6. The side BS6 is located on the outer side of the opening PA12 in the second direction Y. In other words, the side BS6 does not overlap the opening PA12. The side BS6 is located on the outer side with respect to the boundary PAS8 of the opening PA12 in the second direction Y.

In the example shown in FIG. 11, the branch portion BR13 is provided such that the side BS5 of the branch portion BR13 is located in the opening PA12. In addition, in a case where a voltage is applied to the pixel electrode PE12 and the common electrode CE2, the rotational directions can alternately be changed in the second direction Y at the side BS4 of the branch portion BR12, the side BS5 of the branch portion BR13, and the side BS6 of the branch portion BR13, and thus the display device DSP according to Modified Example 5 can implement a high-speed response mode.

Modified Example 5 also has effects similar to those of the first embodiment. In addition, it is possible to improve the light transmittance of a display panel PNL.

Modified Example 6

A display device DSP according to Modified Example 6 of the first embodiment is different from the display device DSP according to Modified Example 5 in the configuration of the branch portions BR.

Figure 12:
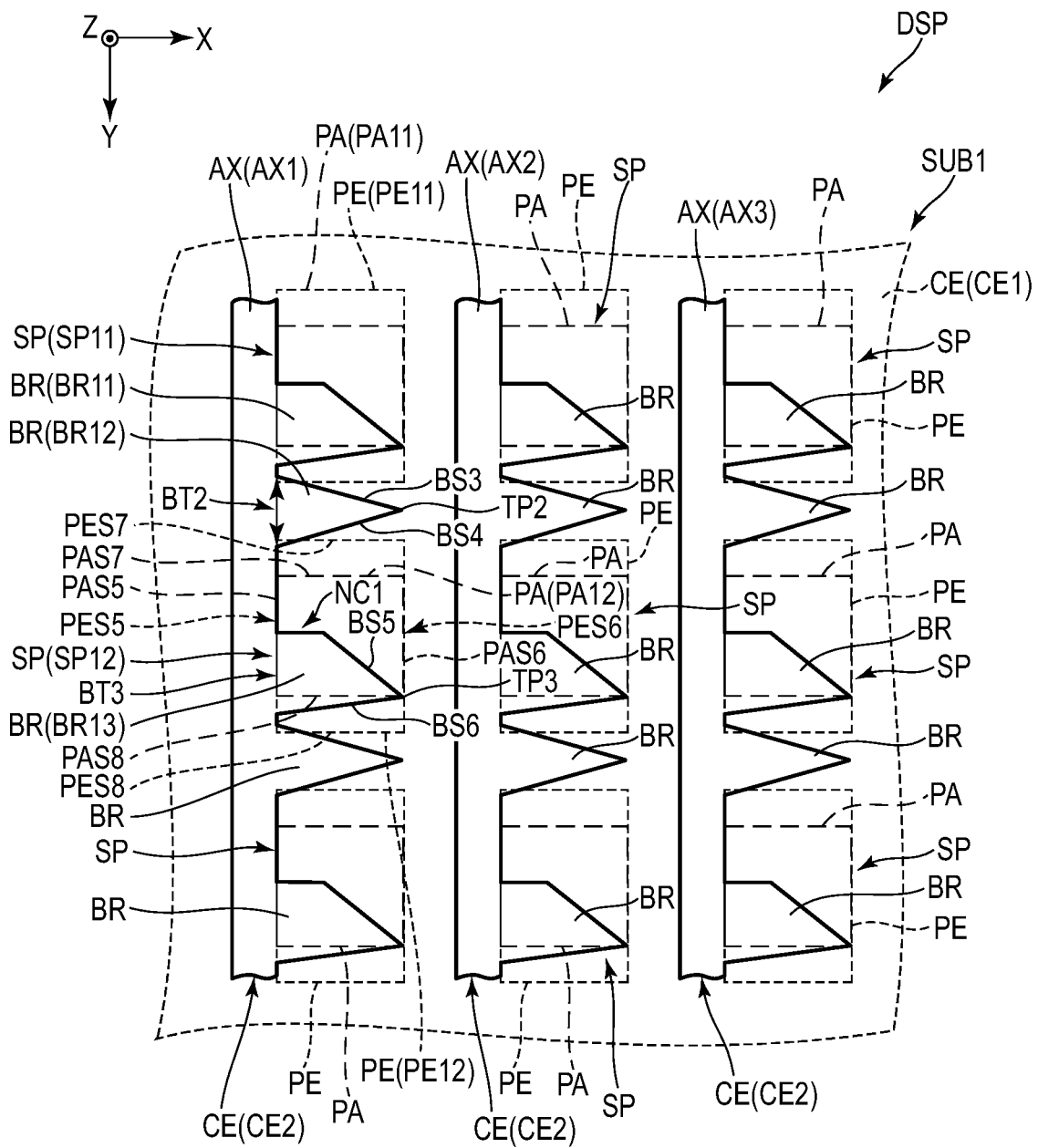
FIG. 12 is a plan view schematically showing a configuration example of a first substrate of a display device according to Modified Example 6.

FIG. 12 is a plan view schematically showing a configuration example of a first substrate SUB1 of the display device DSP according to Modified Example 6. FIG. 12 shows only configurations necessary for description.

In the example shown in FIG. 12, a branch portion BR13 is formed in a rectangular shape. The branch portion BR13 has a side NC1, a side BS5, and a side BS6. In FIG. 12, one end portion of the side NC1 extends from one end portion of a lower base BT3 to the tip side of an arrow in the second direction X. A side BS5 extends from the other end portion of the side NC1 on the opposite side of the one end portion of the side NC1 to a vertex TP3. A side BS6 extends from the other end portion of the lower base BT1 on the opposite side of the one end portion of the lower base BT1 to the vertex TP3. In other words, the shape of the branch portion BR13 shown in FIG. 12 corresponds to a shape obtained by cutting a part of the side BS5 of the branch portion BR13 shown in FIG. 11 on the bottom side BT3 side.

Modified Example 6 also has effects similar to those of Modified Example 5. In addition, it is possible to improve the light transmittance of a display panel PNL.

Modified Example 7

A display device DSP according to Modified Example 6 of the first embodiment is different from the display device DSP according to Modified Example 5 in the configuration of the branch portions BR.

Figure 13:
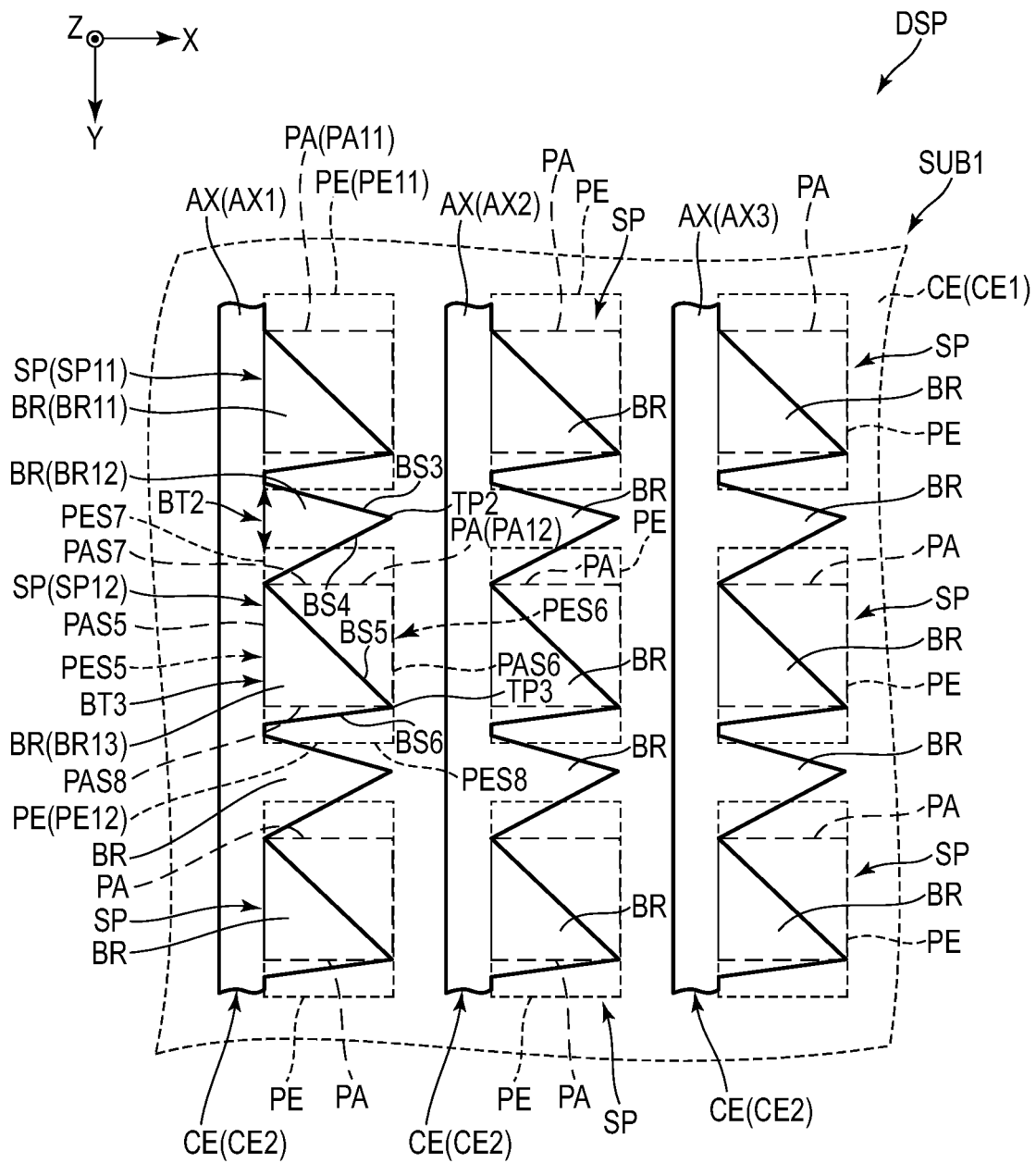
FIG. 13 is a plan view schematically showing a configuration example of a first substrate of a display device according to Modified Example 7.

FIG. 13 is a plan view schematically showing a configuration example of a first substrate SUB1 of the display device DSP according to Modified Example 7. FIG. 13 shows only configurations necessary for description.

In the example shown in FIG. 13, a point of intersection of a side BS4 of a branch portion BR12 and a bottom side BT2 overlaps a boundary PAS7 of an opening PA12 in the second direction Y. A point of intersection of a side BS5 of a branch portion BR13 and a lower base BT3 overlaps the boundary PAS7 of the opening PA12. In other words, the branch portions BR12 and BR13 are in contact with each other in the second direction Y. A configuration of a plurality of branch portions BR shown in FIG. 13 corresponds to the case where the distances DT6 and DT7 are 0 (zero) in the configuration of the plurality of branch portions BR shown in FIG. 11.

Modified Example 6 also has effects similar to those of Modified Example 5.

Second Embodiment

A display device DSP according to the second embodiment is different from the display device DSP according to the first embodiment in the configuration of the branch portions BR.

Figure 14:
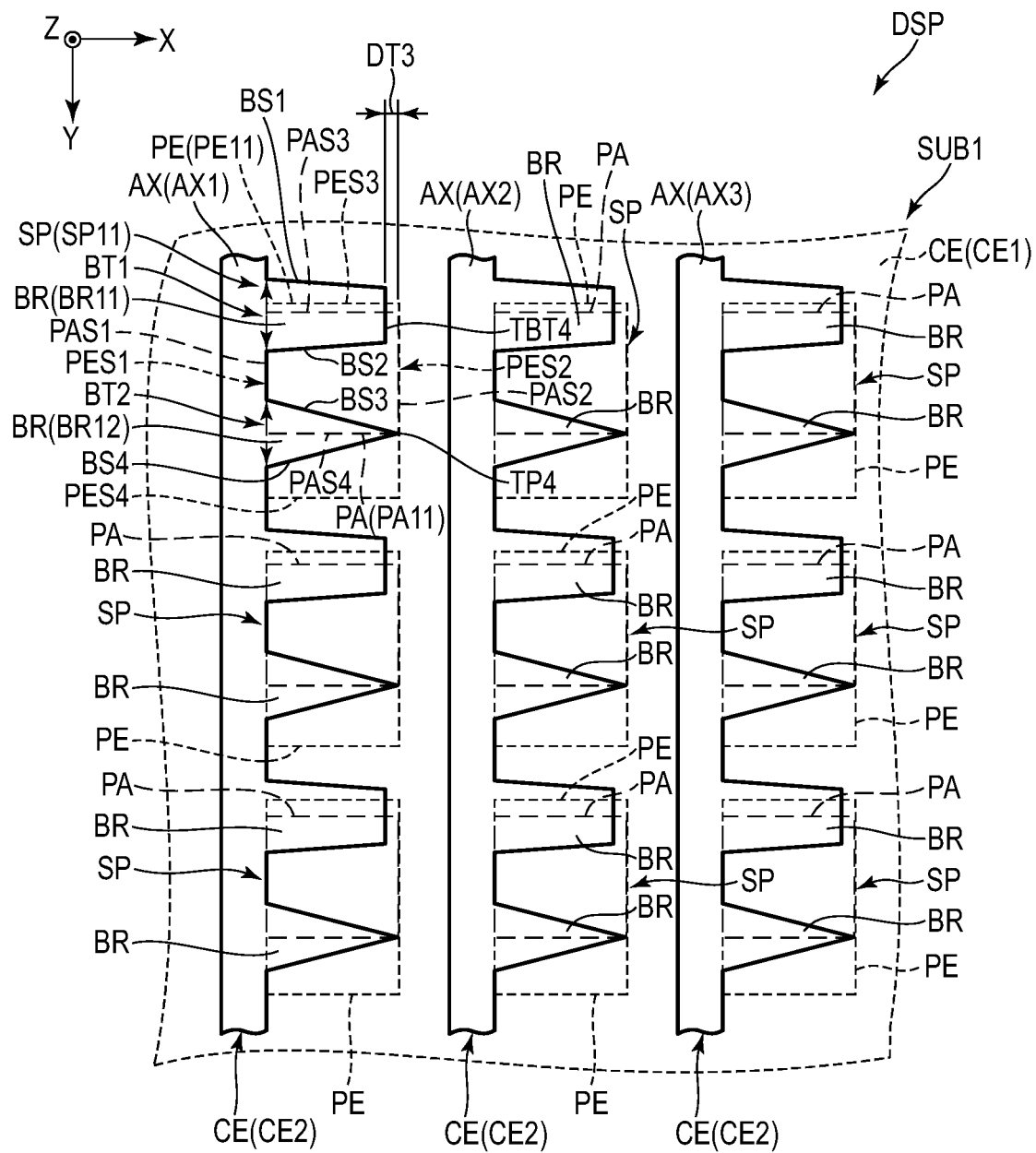
FIG. 14 is a plan view schematically showing a configuration example of a first substrate according to a second embodiment.

FIG. 14 is a plan view schematically showing a configuration example of a first substrate SUB1 according to the second embodiment. FIG. 14 shows only configurations necessary for description.

In the example shown in FIG. 14, the central portion between sides PES3 and PES4 of a pixel electrode PE11 is shifted from the central portion between boundaries PAS3 and PAS4 of an opening PA11 toward the tip side of an arrow in the second direction Y. In other words, the pixel electrode PE11 is shifted toward the tip side of the arrow in the second direction Y with respect to the opening PA11.

In the example shown in FIG. 14, a part of a branch portion BR11 overlaps the pixel electrode PE11, the opening PA11, and the like. The branch portion BR11 overlaps a common electrode CE1. The branch portion BR11 is formed in a trapezoidal shape tapered from a proximal part (lower base) BT1 connected to a shaft portion AX1 toward an upper base TBT1 located on the tip side of an arrow in the first direction X. In FIG. 14, a side BS1 extends from one end portion of the lower base BT1 to one end portion of the upper base TBT1, and a side BS2 extends from the other end portion of the lower base BT1 on the opposite side of the one end portion of the lower base BT1 to the other end portion of the upper base TBT1 on the opposite side of the one end portion of the upper base TBT1. For example, the lengths of the sides BS1 and BS2 are the same. The side BS1 and the side BS2 are angled at the same angle. Incidentally, the sides BS1 and BS2 may be angled at different angles.

In the example shown in FIG. 14, a part of the lower base BT1 of the branch portion BR11 overlaps a side PES1 of the pixel electrode PE11 and a boundary PAS1 of the opening PA11. Incidentally, a portion of the lower base BT1 may not overlap the side PES1 and may not overlap the boundary PAS1. The upper base TBT1 is located on the shaft portion AX1 side with respect to a side PES2 of the pixel electrode PE11. In other words, the upper base TBT1 is located on the inner side with respect to the side PES2. For example, the upper base TBT1 is spaced apart from the side PES2 by a distance DT3 and located on the shaft portion AX1 side with respect to the side PES2. The upper base TBT1 does not overlap a boundary PAS2 of the opening PA11. The side BS1 is located on the outer side of the opening PA11 in the second direction Y. In other words, the side BS1 does not overlap the opening PA11. The side BS1 is located on the side opposite to the tip side of the arrow in the second direction Y with respect to the boundary PAS3 of the opening PA11. The side BS2 is located on the inner side of the opening PA11. In other words, the side BS2 overlaps the opening PA11. The side BS2 is located between the boundaries PAS3 and PAS4 of the opening PA11 in the second direction Y.

In the example shown in FIG. 14, a part of the branch portion BR12 overlaps the opening PA11 and the like. The branch portion BR12 overlaps the common electrode CE1, the pixel electrode PE11, and the like. The branch portion BR12 is formed in a trapezoidal shape tapered from a proximal part (bottom side) BT2 connected to the shaft portion AX1 toward a vertex TP2 located on the tip side of the arrow in the first direction X. In FIG. 14, a side BS3 extends from one end portion of the bottom side BT2 to the vertex TP2, and a side BS4 extends from the other end portion of the bottom side BT2 on the opposite side of the one end portion of the bottom side BT2 to the vertex TP2. For example, the lengths of the sides BS3 and BS4 are the same. Incidentally, the lengths of the sides BS3 and BS4 may be different. The side BS3 and the side BS4 are angled at the same angle. Incidentally, the sides BS3 and BS4 may be angled at different angles.

In the example shown in FIG. 14, the bottom side BT2 of the branch portion BR12 overlaps a side PES11 of the pixel electrode PE11. Incidentally, the bottom side BT2 may not overlap the side PES11. A part of the bottom side BT12 of the branch portion BR12 overlaps the boundary PAS11 of the opening PA11. Incidentally, the bottom side BT2 may not overlap the boundary PAS11. The vertex TP2 overlaps the boundaries PAS2 and PAS4 of the opening PA11 and the side PES2 of the pixel electrode PE11. In other words, in the example shown in FIG. 14, the lateral width of the branch portion BR11 is shorter than the lateral width of the branch portion BR12. In addition, the pixel electrode PE11 is disposed from the bottom side BT2 to the vertex TP2. Incidentally, the vertex TP2 may not overlap at least one of the boundaries PAS2 and PAS4 and may not overlap the side PES2. The sides BS3 and BS4 overlap the pixel electrode PE11. The side BS3 is located on the inner side of the opening PA11 in the second direction Y. In other words, the side BS3 overlaps the opening PA11. The side BS3 extends from a point of intersection of the boundary PAS2 and the boundary PAS4 to the boundary PAS1 between the boundaries PAS3 and PAS4 of the opening PA11. The side BS4 is located on the outer side of the opening PA11 in the second direction Y. In other words, the side BS4 does not overlap the opening PA11. The side BS4 is located on the tip side of the arrow in the second direction Y with respect to the boundary PAS4 of the opening PA11.

In the example shown in FIG. 14, the branch portion BR11 and the branch portion BR12 are provided such that the opening PA11 overlaps a part of the branch portion BR11 and a part of the branch portion BR12. In addition, in a case where a voltage is applied to the pixel electrode PE11 and a common electrode CE2, rotational directions can alternately be changed in the second direction Y at the side BS2 of the branch portion BR11, the side BS3 of the branch portion BR12, and the side BS4 of the branch portion BR12, and thus the display device DSP according to the second embodiment can implement a high-speed response mode.

The second embodiment also has effects similar to those of the first embodiment. In addition, it is possible to improve the light transmittance of a display panel PNL.

Third Embodiment

A display device DSP according to the third embodiment is different from the display devices DSP according to the first embodiment, the second embodiment, Modified Examples 1 to 7, and the second embodiment described above in that the display device DSP includes a light-shielding layer BM.

Figure 15:
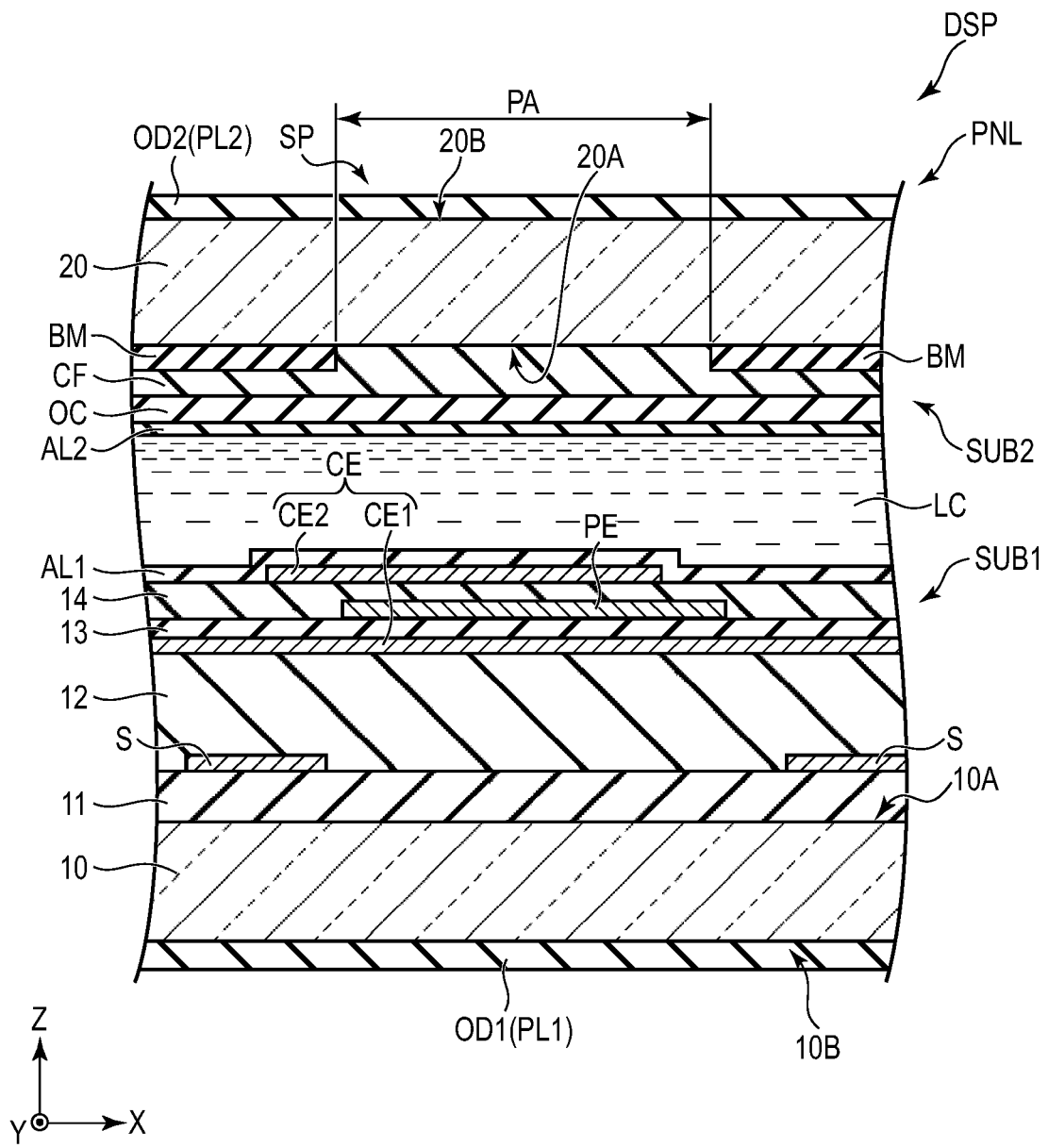
FIG. 15 is a cross-sectional view schematically showing an example of a display device according to a third embodiment.

FIG. 15 is a cross-sectional view schematically showing an example of the display device DSP according to the third embodiment.

A second substrate SUB2 further includes the light-shielding layer BM and the like. The light-shielding layer BM is located under an insulating substrate 20 and is in contact with an opposed surface 20A of the insulating substrate 20. The light-shielding layer BM is located directly above a signal line S and a scanning line C. The light-shielding layer BM is disposed at a boundary of a sub-pixel SP. In the third embodiment, an opening PA is formed by the light-shielding layer BM disposed as described above. The opening PA is opposed to a pixel electrode PE. A color filter CF is located under the insulating substrate 20 and the light-shielding layer BM and covers the insulating substrate 20 and the light-shielding layer BM.

Figure 16:
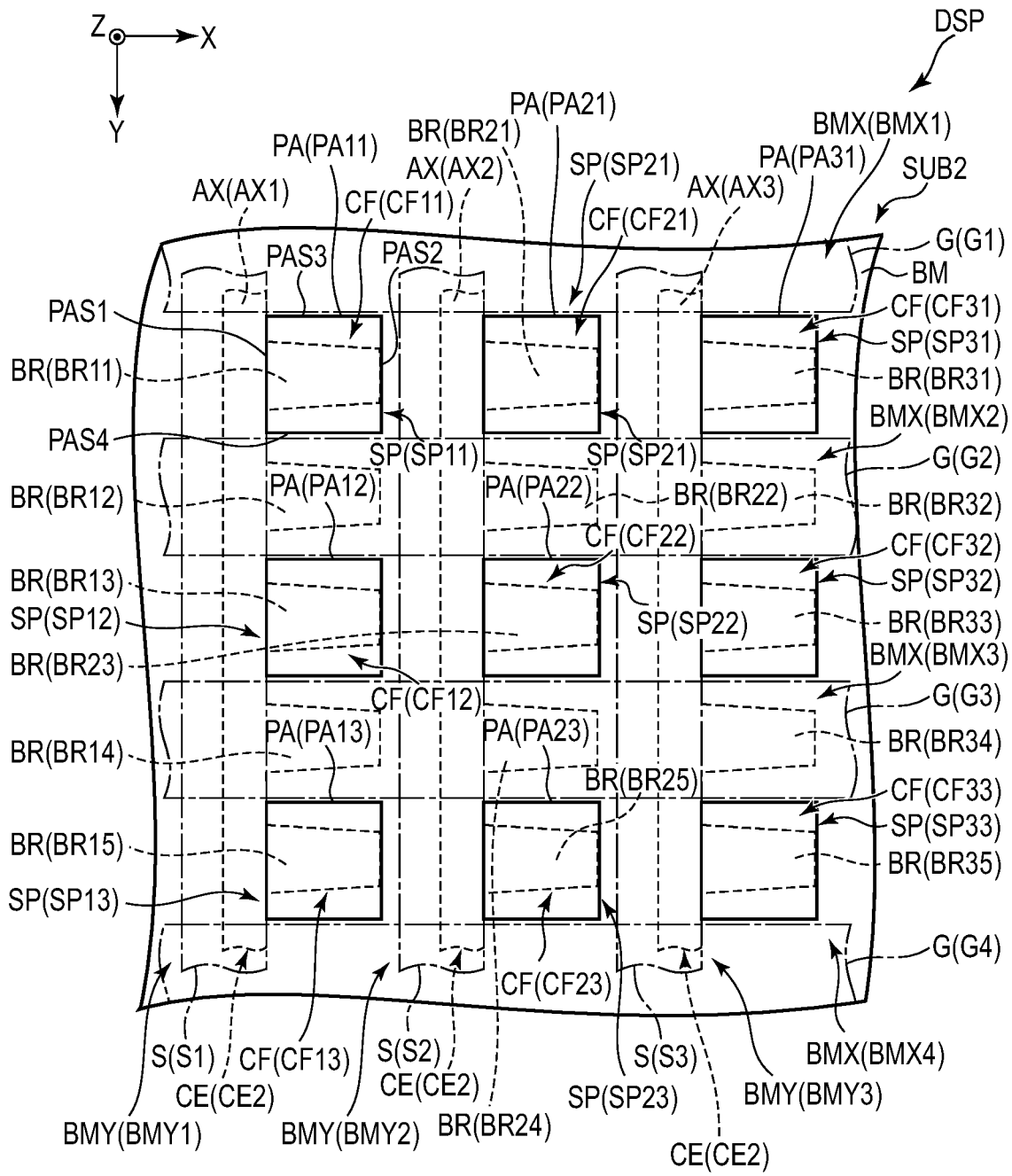
FIG. 16 is a plan view schematically showing a configuration example of a second substrate according to the third embodiment.

FIG. 16 is a plan view schematically showing a configuration example of the second substrate SUB2 according to the third embodiment. Incidentally, FIG. 16 shows only configurations necessary for description. In addition, FIG. 16 shows the shaft portions AX, branch portions BR, signal lines S, and scanning lines G of the first substrate SUB1 shown in FIG. 5.

The second substrate SUB2 includes the light-shielding layer BM and the color filter CF.

The light-shielding layer BM has a light shielding property. In the example shown in FIG. 16, the light-shielding layer BM is formed in a grid pattern. Incidentally, the light-shielding layer BM may be formed in a ladder pattern, a stripe pattern, or the like other than the grid pattern. For example, the light-shielding layer BM includes longitudinal parts BMY and lateral parts BMX. The longitudinal parts BMY are arranged at intervals in the first direction X and extend in the second direction Y. In planar view, the longitudinal parts BMY overlap the signal lines S and the shaft portions AX. Each of the longitudinal parts BMY is formed in a belt shape having a substantially constant width in the first direction X. In the example shown in FIG. 16, the longitudinal parts BMY1, BMY2, and BMY3 have substantially the same width in the first direction X, and are arranged at regular intervals in the first direction X. The longitudinal parts BMY1 to BMY3 extend in the second direction Y along the signal lines S1 to S3 and the shaft portions AX1 to AX3, respectively, and overlap the signal lines S1 to S3 and the shaft portions AX1 to AX3. The lateral parts BMX are arranged at intervals in the second direction Y and extend in the first direction X. In planar view, the lateral parts BMX overlap the scanning lines G, the even-numbered branch portions BR, and the like. Each of the lateral parts BMX is formed in a belt shape having a substantially constant width in the second direction Y. In the example shown in FIG. 6, the lateral parts BMX1, BMX2, BMX3, and BMX4 have substantially the same width in the second direction Y, and are arranged at regular intervals in the second direction Y. The lateral parts BMX1 to BMX4 extend along the scanning lines G1 to G4, respectively, and overlap the scanning lines G1 to G4. The lateral part BMX2 overlaps the even-numbered branch portions BR12, BR22, and BR32. The lateral part BMX3 overlaps the even-numbered branch portions BR14, BR24, and BR34. In planar view, the longitudinal parts BMY and the lateral parts BMX intersect each other. In the example shown in FIG. 6, the longitudinal parts BMY and the lateral parts BMX cross each other. Incidentally, the longitudinal parts BMY and the lateral parts BMX may intersect each other in a T shape or a Y shape.

The light-shielding layer BM has a plurality of openings PA. The plurality of openings PA are regions that are partitioned by the light-shielding layer BM and contribute to display. The plurality of openings PA are arranged in a matrix on the X-Y plane. In the example shown in FIG. 16, openings PA11, PA12, PA13, PA21, PA22, PA23, PA31, PA32, and PA33 are arranged in a matrix. In FIG. 16, the openings PA11, PA12, PA13, PA21, PA22, PA23, PA31, PA32, and PA33 have the same shape and the same size. The openings PA11 to PA13 are arranged at regular intervals in the second direction Y. The openings PA21 to PA23 are arranged at regular intervals in the second direction Y. The openings PA31 to PA33 are arranged at regular intervals in the second direction Y. The openings PA11, PA21, and PA31 are arranged at regular intervals in the first direction X. The openings PA12, PA22, and PA32 are arranged at regular intervals in the first direction X. The openings PA13, PA23, and PA33 are arranged at regular intervals in the first direction X. In the example shown in FIG. 16, the opening PA11 overlaps the branch portion BR11, and the light-shielding layer BM (lateral part BMX2) between openings PA11 and PA12 overlaps the branch portion BR12.

The color filter CF overlaps the openings PA. In the example shown in FIG. 16, the color filter CF includes color filters CF11, CF12, CF13, CF21, CF22, CF23, CF31, CF32, and CF33. The color filter CF11 overlaps the opening PA11. The color filter CF12 overlaps the opening PA12. The color filter CF13 overlaps the opening PA13. The color filter CF21 overlaps the opening PA21. The color filter CF22 overlaps the opening PA22. The color filter CF23 overlaps the opening PA23. The color filter CF31 overlaps the opening PA31. The color filter CF32 overlaps the opening PA32. The color filter CF33 overlaps the opening PA33.

The third embodiment also has effects similar to those of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate;
a second substrate opposed to the first substrate; and
a liquid crystal layer located between the first substrate and the second substrate, wherein
the first substrate includes a first common electrode, a second common electrode, a pixel electrode, a scanning line, and a signal line,
the scanning line is formed to extend in a first direction,
the signal line is formed to extend in a second direction,
the first common electrode includes a shaft portion extending in the second direction, a first branch portion extending in the first direction from the shaft portion, and a second branch portion extending in the first direction from the shaft portion,
a first opening surrounded by a pair of the scanning lines and a pair of the signal lines, and a second opening surrounded by a pair of the scanning lines and a pair of the signal lines and provided at an interval from the first opening in the second direction are provided,
the second common electrode is disposed from the first opening to the second opening and overlaps the first common electrode,
the first common electrode and the second common electrode has the same electric potential,
the first branch portion overlaps the pixel electrode and the first opening, and
the second branch portion overlaps the scanning line between the first opening and the second opening, and
the pixel electrode is located between the first common electrode and the second common electrode in cross-sectional view.

2. The display device according to claim 1, wherein the first branch portion is formed in a triangular shape having a bottom side connected to the shaft portion and a vertex opposed to the bottom side.

3. The display device according to claim 2, wherein the pixel electrode is disposed from the bottom side to the vertex.

4. The display device according to claim 2, wherein
the first branch portion has a first side extending from the vertex to one end portion of the bottom side and a second side extending from the vertex to the other end portion of the bottom side on the opposite side of the one end portion of the bottom side, and
a length of the first side is different from a length of the second side.

5. The display device according to claim 4, wherein the length of the first side is longer than the length of the second side,
the first side overlaps the first opening, and
the second side overlaps the scanning line between the first opening and the second opening.

6. The display device according to claim 1, wherein the first branch portion is formed in a trapezoidal shape having a lower base connected to the shaft portion and an upper base opposed to the lower base.

7. The display device according to claim 6, wherein the pixel electrode extends in the first direction from the upper base.

8. The display device according to claim 1, wherein the pixel electrode is spaced apart from the shaft portion in the first direction.

9. The display device according to claim 1, wherein a part of the second branch portion overlaps the pixel electrode.

10. The display device according to claim 1, wherein the first substrate includes the scanning line extending in the first direction between the first opening and the second opening, and a first signal line and a second signal line that extend in the second direction and are arranged in the first direction with the first opening and the second opening interposed therebetween.

11. A display device comprising:
a first substrate;
a second substrate opposed to the first substrate; and
a liquid crystal layer located between the first substrate and the second substrate, wherein
the first substrate includes a first electrode and a pixel electrode,
the second substrate includes a light-shielding layer,
the first electrode includes a shaft portion extending in a first direction intersecting a second direction, a first branch portion extending in the first direction from the shaft portion, and a second branch portion extending in the first direction from the shaft portion, the first branch portion is formed in a triangular shape having a bottom side connected to the shaft portion and a vertex opposed to the bottom side, the second branch portion is formed in a trapezoidal shape having a lower base connected to the shaft portion and an upper base opposed to the lower base, a length of the second branch portion in the first direction is shorter than a length of the first branch portion in the first direction, the light-shielding layer includes a first opening, a second opening arranged at an interval from the first opening in the second direction, and a third opening arranged at an interval from the first opening in the second direction on the opposite side of the second opening, the first opening overlaps a part of the first branch portion and a part of the second branch portion, and the pixel electrode overlaps the first opening.

12. The display device according to claim 11, wherein the pixel electrode is disposed from the bottom side to the vertex.

13. The display device according to claim 11, wherein the pixel electrode overlaps the first branch portion and a part of the second branch portion.

\* \* \* \* \*